(12) United States Patent
Brown et al.

(10) Patent No.: US 8,764,364 B2
(45) Date of Patent: Jul. 1, 2014

(54) SYSTEM AND METHODS FOR WALL AND CEILING FASTENING

(75) Inventors: Brian A. Brown, Alamo, CA (US); Gregory A. M. Brown, Lafayette, CA (US)

(73) Assignee: Illinois Tool Works Inc., Glenview, IL (US)

( * ) Notice: Subject to any disclaimer, the term of this patent is extended or adjusted under 35 U.S.C. 154(b) by 1092 days.

(21) Appl. No.: 11/171,088

(22) Filed: Jun. 29, 2005

(65) Prior Publication Data

US 2006/0222474 A1 Oct. 5, 2006

Related U.S. Application Data

(63) Continuation-in-part of application No. 10/807,819, filed on Mar. 24, 2004, now abandoned.

(51) Int. Cl.
| F16B 13/00 | (2006.01) |
| F16B 13/04 | (2006.01) |
| F16B 21/02 | (2006.01) |
| F16B 45/00 | (2006.01) |
| B21J 15/02 | (2006.01) |

(52) U.S. Cl.
USPC .......... 411/340; 411/344; 248/304; 29/525.05

(58) Field of Classification Search
USPC ................ 411/340, 29, 15–16, 30–31, 35, 411/344–346, 45–48; 248/220.31, 304; 29/525.05, 525.06
See application file for complete search history.

(56) References Cited

U.S. PATENT DOCUMENTS

| 492,418 A | 2/1893 | McClintock |
| 638,384 A | 12/1899 | Dyer |

(Continued)

FOREIGN PATENT DOCUMENTS

| DE | 202005011883 U1 | 10/2005 |
| JP | 02-501586 | 5/1990 |

(Continued)

OTHER PUBLICATIONS

The International Search Report and the Written Opinion of the International Searching Authority (European Patent Office) issued Jul. 1, 2008.

(Continued)

*Primary Examiner* — Victor Batson
*Assistant Examiner* — Tyler Johnson
(74) *Attorney, Agent, or Firm* — Levenfeld Pearlstein, LLC

(57) ABSTRACT

A system (100, 600, 700) for fastening objects to a wall or ceiling (120) comprises a rear, wall-anchor section (105, 607, 705) with a bore, and a front, pivotable section (110, 602, 604, 720), rigidly abutted together with no gap, aligned by a projection (135), and connected by a "living" hinge, strap, flap, lanyard or other type of connector (115). The pivotable section has a sharpened tip (112, 630, 635, 725) for penetrating the wall while the fastener is forced into the wall by a hammer or other driving tool or device, or manually by hand. The two sections of the fastener have a tapered, elliptical cross-section (111) which both prevents rotation of the fastener and locally reduces load-responsive pressure in the wallboard. To install, the axes of the wall-anchor and pivotable sections of the fastener are first aligned. The fastener is forced into the wall one of the above means. Then a pin (140) is manually inserted into the bore of the wall-anchor section. When the pin meets the projection the pivotable section is forced to rotate about the hinge. A locking tooth (139) secures the pin by interfering with either threads or notches in the pin. Alternatively, the pin forces past the projection and wedges between the projection and the bore of the wall-anchor section.

50 Claims, 26 Drawing Sheets

(56) References Cited

U.S. PATENT DOCUMENTS

| | | | |
|---|---|---|---|
| 868,353 A | 10/1907 | Martin, Jr. | |
| 974,391 A | 11/1910 | Jossart | |
| 977,795 A | 12/1910 | Gronke et al. | |
| RE13,204 E | 2/1911 | Jossart | |
| 1,051,893 A | 2/1913 | Joseph | |
| 1,236,293 A | 8/1917 | Grosser | |
| 1,452,514 A | 4/1923 | Kartizky | |
| 2,266,892 A | 12/1941 | Mullen | |
| 2,916,235 A | 12/1959 | Nagel | |
| 3,188,905 A * | 6/1965 | Millet | 411/80.1 |
| 3,213,745 A | 10/1965 | Dwyer | |
| 3,431,813 A * | 3/1969 | Johnson | 411/61 |
| 3,897,035 A | 7/1975 | Solo et al. | |
| 3,983,779 A | 10/1976 | Dimas | |
| 4,022,100 A * | 5/1977 | Johnson | 411/80.5 |
| 4,181,061 A | 1/1980 | McSherry | |
| 4,196,883 A | 4/1980 | Einhorn et al. | |
| 4,233,881 A | 11/1980 | Carrier | |
| 4,274,324 A | 6/1981 | Giannuzzi | |
| 4,289,062 A | 9/1981 | Schiefer | |
| 4,322,194 A | 3/1982 | Einhorn | |
| 4,500,238 A | 2/1985 | Vassiliou | |
| 4,601,625 A * | 7/1986 | Ernst et al. | 411/387.4 |
| 4,662,808 A * | 5/1987 | Camilleri | 411/340 |
| 4,669,936 A * | 6/1987 | Camilleri | 411/340 |
| 4,752,170 A | 6/1988 | McSherry et al. | |
| 4,902,179 A | 2/1990 | Harker | |
| 4,989,817 A | 2/1991 | Camilleri | |
| 5,037,257 A * | 8/1991 | Kubic et al. | 411/30 |
| 5,221,167 A | 6/1993 | Girkin | |
| 5,409,336 A | 4/1995 | Jericevich et al. | |
| 5,443,343 A | 8/1995 | Mutz et al. | |
| 5,447,005 A | 9/1995 | Giannuzzi | |
| 5,533,851 A * | 7/1996 | Remmers | 411/344 |
| 5,881,982 A | 3/1999 | Hollingsworth et al. | |
| 6,186,455 B1 | 2/2001 | Hollingsworth et al. | |
| 6,435,789 B2 * | 8/2002 | Gaudron | 411/344 |
| 6,494,653 B2 * | 12/2002 | Remmers | 411/344 |
| 6,641,107 B1 | 11/2003 | Janssen | |
| 6,676,349 B1 | 1/2004 | Mey | |
| 6,921,237 B2 | 7/2005 | Vassiliou | |
| 7,001,124 B2 * | 2/2006 | Panasik et al. | 411/30 |
| 7,014,408 B2 | 3/2006 | O'Banion et al. | |
| 7,118,315 B2 | 10/2006 | Huang | |
| 7,143,497 B2 * | 12/2006 | Panasik et al. | 29/525.05 |
| 7,752,732 B2 * | 7/2010 | Brown et al. | 29/525.05 |
| 7,850,408 B2 * | 12/2010 | Ernst et al. | 411/344 |
| 8,011,080 B2 * | 9/2011 | Brown et al. | 29/525.13 |
| 8,109,705 B1 * | 2/2012 | Brown et al. | 411/344 |
| 8,197,169 B2 * | 6/2012 | Ernst | 411/345 |
| 8,235,635 B1 * | 8/2012 | Brown et al. | 411/344 |
| 8,444,358 B2 * | 5/2013 | Gaudron et al. | 411/340 |
| 8,568,075 B2 * | 10/2013 | Gaudron et al. | 411/340 |
| 2005/0076602 A1 | 4/2005 | Routhier | |
| 2005/0175429 A1 * | 8/2005 | Panasik et al. | 411/80.1 |
| 2008/0199275 A1 * | 8/2008 | Brown et al. | 411/340 |
| 2011/0268527 A1 * | 11/2011 | Gaudron et al. | 411/30 |
| 2013/0230365 A1 * | 9/2013 | Gaudron et al. | 411/340 |

FOREIGN PATENT DOCUMENTS

| | | |
|---|---|---|
| JP | 03525 B2 | 1/1991 |
| JP | 0532813 U | 4/1993 |
| JP | 3287587 B2 | 6/2002 |
| WO | WO 00/25031 | 5/2000 |
| WO | 2007/005345 A | 1/2007 |

OTHER PUBLICATIONS

International Search Report dated Jul. 17, 2008 for PCT/US06/24649.

* cited by examiner

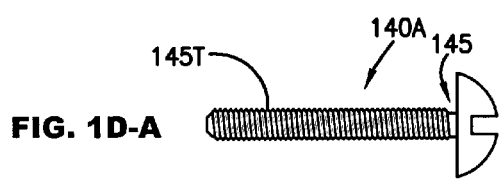
FIG. 1D-A
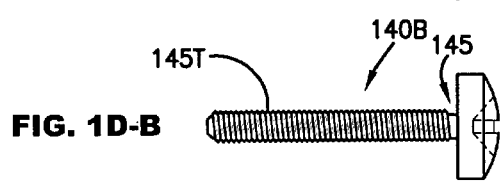
FIG. 1D-B
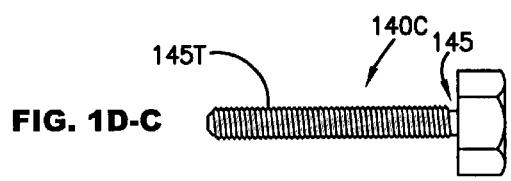
FIG. 1D-C
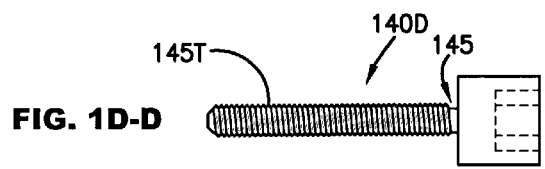
FIG. 1D-D
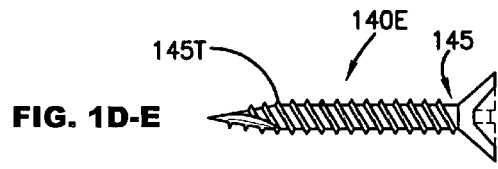
FIG. 1D-E
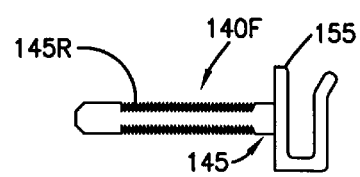
FIG. 1D-F
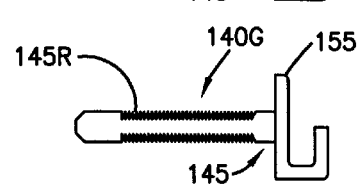
FIG. 1D-G
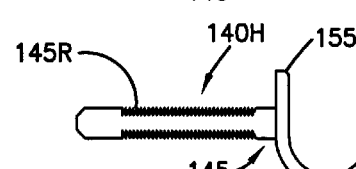
FIG. 1D-H
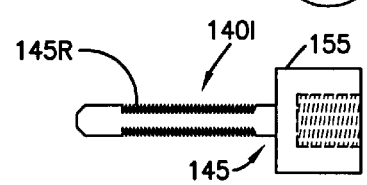
FIG. 1D-I
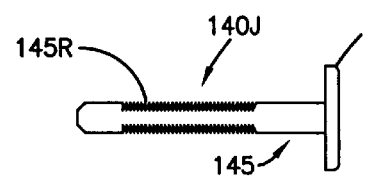
FIG. 1D-J

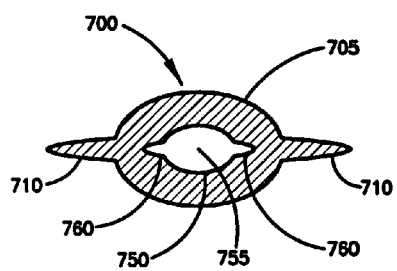
FIG. 7C-A
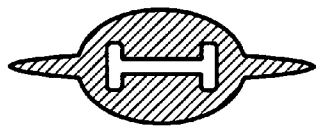
FIG. 7C-B
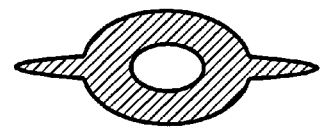
FIG. 7C-C
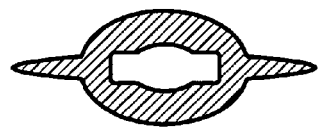
FIG. 7C-D
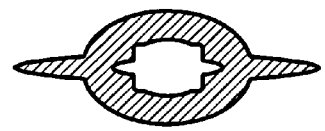
FIG. 7C-E

FIG. 7H-A
FIG. 7H-B
FIG. 7H-C
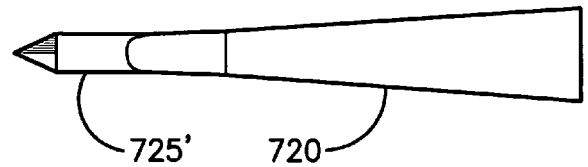
FIG. 7G
FIG. 7H-D
FIG. 7H-E

SYSTEM AND METHODS FOR WALL AND CEILING FASTENING

CROSS-REFERENCE TO RELATED APPLICATIONS

This application is a Continuation-In-Part of patent application Ser. No. 10/807,819, filed Mar. 24, 2004, now abandoned.

FEDERALLY SPONSORED RESEARCH

None

SEQUENCE LISTING

None

BACKGROUND

1. Field of Invention

The present invention relates to mounting systems, in particular to methods and apparatus for mounting fasteners to hollow walls and ceilings.

2. Prior Art Fasteners

Most walls and ceilings of residential and commercial structures have a hollow cavity construction, i.e., there is a hollow space behind the wall. The wall comprises a sheet of material, typically between 1 and 2.54 cm thick, affixed to a suitable frame which includes wood or metal framing members (studs or joists). The framing members typically are spaced on 41 or 61 cm centers. The sheet material is sold under the trademark SHEETROCK by United States Gypsum Co., Chicago, and is known generically as drywall, wallboard, plasterboard, and gypsum board. Another less common wall and ceiling material with similar characteristics is plaster applied over a lath substrate. In the discussion below, the terms wall and ceiling are synonymous.

A variety of fasteners are commercially available for attaching, hanging, or securing objects such as pictures, mirrors, shelving, cabinetry, towel racks, handrails, and other objects to a wall at a location other than over the area where a framing member is located. Most of these fasteners can be divided into two general types: toggle and expansion.

Toggle Fasteners

Toggle fasteners generally comprise two components. An anchor or first component has spreading or tilting arms and is inserted with the arms folded in into a drilled hole in the wall material. After the anchor is inserted, an activator or second component, typically a screw or pin, is used to cause the anchor's arms to tilt or spread within the hollow space behind the wall, thereby locking the fastener in place on the wall.

Nagel, in U.S. Pat. No. 2,916,235 (1959) discloses a fastener in which the anchor comprises a pivot-mounted arm at the end of a flared tube as the first component. A hole is drilled into the wall and the anchor fully inserted so that the flared end rests against the outer surface of the wall, preventing further insertion. The activator is a screw, that, when inserted into the tube, forces the arm to rotate until its distal end contacts the inside of the wall. Turning the screw causes it to wedge beneath the end of the arm nearest the pivot. This completes installation of the fastener. While Nagel's device forms a secure fastener for walls of varying thickness, it suffers from several drawbacks. The fastener cannot be installed by simply hammering or screwing it into place. A hole must first be made. In order to permit the screw to wedge beneath the arm, the tube must be of substantially larger diameter than the screw. In turn, this requires a larger-than-desirable hole. Further, when fully wedged against the pivot-end of the arm, the screw does not seat in a position perpendicular to the wall. Thus the screw head does not lie flush with the wall, resulting in a less-than-perfect anchoring with a high-pressure contact at the top side of the screw head, and no contact at the bottom of the screw head. Finally, Nagel's fastener is somewhat complex, likely requiring manual assembly of the pivot joint.

Dwyer, in U.S. Pat. No. 3,213,745 (1965), Johnson, in U.S. Pat. No. 3,431,813 (1969) and U.S. Pat. No. 4,022,100 (1977), McSherry, in U.S. Pat. No. 4,181,061 (1980), Schiefer, in U.S. Pat. No. 4,289,062 (1981), and Camilleri, in U.S. Pat. No. 4,662,808, all teach fasteners which operate on the same principle. The anchor is inserted into a drilled hole in the wall. A flared front portion of the anchor rests against the outer surface of the wall, preventing further insertion. The activator, a screw or pin, is arranged to cause two or more arms to spread in the space behind the wall, eventually resting against the inner surface of the wall. An object is then secured to the wall by the activator. As with Nagel, a pre-made hole in the wall is required. In many instances this causes the inside portion of the wall to crumble, weakening the wall at that point and limiting the weight of load supportable by the fastener.

Ellenberger, in U.S. Pat. No. 3,550,499 (1970), Vassiliou, in U.S. Pat. No. 4,500,238 (1985), Giannuzzi, in U.S. Pat. No. 5,447,005 (1995), Moretti, in U.S. Pat. No. 5,224,805 (1993), and Remmers, in U.S. Pat. No. 6,494,653 (2002), teach fasteners with screw or pin-spread arms similar to those described above. However, the anchor is hammered directly into the wall material, without requiring a pre-drilled hole. The activator is then used to drive the arms apart, securing the fastener.

Remmers has a further drawback in that he includes a gap in the form of a channel (FIG. 7) formed in his device between the two fingers or arms. The presence of this gap can allow tip to wobble and deflect as his anchor is hammered or screwed into a wall. Such motion can result in a larger-than desired hole, weakening the anchorage at barrel 54. Further, this wobbling motion and deflection can cause the anchor to enter the wall at an angle, causing the front and back sides of the wall to tear or crumble, degrading the integrity of the wall material. In addition, a hammer blow could cause his fastener to bend or crumple at the gap. In this event, the fastener might not enter the wall at all.

Harker, in U.S. Pat. No. 4,902,179 (1990), teaches a drive-in anchor with hinged flanges which expand circumferentially to engage the back side of the wall in response to insertion of a screw. In addition, when the screw is inserted, a longitudinally slit portion of the body expands within the hole created by the fastener. The expansion of his hinged flange adjacent the inside of wallboard 21 (FIG. 2) is limited at most to the diameter of pin or screw 60 (FIG. 2). Thus Harker's fastener forms a physical barrier of only limited extent on the back side of wallboard 21. In addition, if screw 60 is over-torqued, it will simply continue to rotate against the inner surface of the fastener, thereby reducing the fastener's effectiveness.

Gaudron, in U.S. published patent application 2001/0046429, teaches a self-drilling fastener with a flanged, toggling anchor. After the fastener drills its way through a wall, its flanged portion rests against the front side of the wall. The toggling portion is positioned behind the wall and pivots to a position parallel to the plane of the wall. Inserting and turning a screw draws the toggled portion toward the back side of the wall, where it rests, securing the fastener.

Three holding methods are common to the above prior-art fasteners. In the first method, toggles are inserted through the wall and then urged into contact with the back side of the wall by a screw. In the second method, the anchor comprises pre-folded arms which, after full insertion of the fastener into the wall, are forced to spread against the back side of the wall by the second component. In the third method, flanges engage the back side of the wall while a slit portion expands to fill the hole through which the fastener is passed. All three methods, as stated, have the significant disadvantages noted.

Expansion Fasteners

Expansion fasteners are generally secured by an increase in their diameter. Some comprise an anchor which is hammered into a wall or inserted into a pre-drilled hole. An activator such as a pin or screw is forced into a central, cylindrical cavity within the fastener, increasing its diameter. Still other fasteners have tangs which springably expand to resist pull-out of the fastener.

Karitzky, in U.S. Pat. No. 1,452,514 (1923), and Girkin, in U.S. Pat. No. 5,221,167 (1993), teach similar fasteners which are inserted into a drilled hole. A nail or screw is inserted into the fastener, forcing its diameter to increase, thus securing it in the hole. Girkin additionally includes a lock nut which forms part of the fastener.

In U.S. Pat. No. 4,322,194 (1982), Einhorn teaches a wall fastener which is hammered or otherwise driven into a wall. After insertion, a screw forces two or more arms apart, compressing the wall around the fastener.

In U.S. Pat. No. 3,983,779 (1976), Dimas teaches a nail with tangs. The nail is driven through roofing material into decking beneath by a hammer. Tangs on the nail prevent withdrawal of the nail and securely hold the roofing material in place on the decking.

Expansion fasteners must exert sufficient expansion force to be secure, but must not fracture or crumble their host material. These fasteners are generally inappropriate for use in friable materials, such as dry-wall gypsum board.

The toggle and expansion fasteners described above suffer from significant disadvantages. None of them come with the ready-made pins and tools needed to insert the pins that must be provided. Thus these are anchor and pin devices where one must select the correctly-sized fastener for the screw, and then select the properly sized drill bit for the fastener so as to avoid poor anchorage. In addition, they cannot accept a variety of ready-made, pre-configured pins that can be inserted without tools. Other disadvantages include the need for drilling the wall for the fastener, difficulty in tightening properly since over-torquing the fastener or the screw often results in a failure of the wall, and an unsightly oversized hole when the fastener is removed in such an over-torqued condition. Some of these fastening systems are also non-removable or are difficult to remove without leaving a large, unsightly hole in the wall. In addition, expansion fasteners crush the friable drywall material, limiting the grip of the device in the wall.

3. Advantages

Accordingly, several advantages of one or more aspects are that it provides an improved wall fastener, a more secure anchorage system, and method by which a fastener can be hammered or otherwise driven into a wall with minimal damage to the wall material. Further advantages of various aspects are that it provides a fastener which usually does not require a pre-drilled hole, which is more easily mass-produced, which can be configured during installation as a contiguous, rigid unit without gaps, which can accept a variety of pre-configured pins that can be installed without using tools, and which can be easily removed. Still further advantages of various aspects will become apparent from a consideration of the ensuing description and accompanying drawings.

SUMMARY

In accordance with one preferred embodiment of the invention, a fastener comprises a wall anchor section and a pivotable section or tip. The two sections are joined by an integral or "living" hinge, strap, flap, lanyard, or other type of connecting element. These sections hingeably snap together as a rigid, straight unit for insertion into the wall. Other embodiments comprise two or more arms that appear to grow out of the body. In at least one embodiment, the arms are joined to the wall anchor section by pivoting gears instead of living hinges. After the wall anchor section is seated, the pivotable section(s) is forced to pivot at the hinge or pivoting gears, causing the pivotable section to rest against the inside surface of the wall, thereby securing the fastener.

DRAWING FIGURES

FIGS. 1D and 1E illustrate exemplary pins for the fastening system of FIG. 1A.

FIGS. 1F through 1H are cross-sectional view showing exemplary pins inserted in a bore.

FIGS. 7A-7I are various views of yet another embodiment of the fastening system in accordance with the invention.

REFERENCE NUMERALS

Figure 1A:
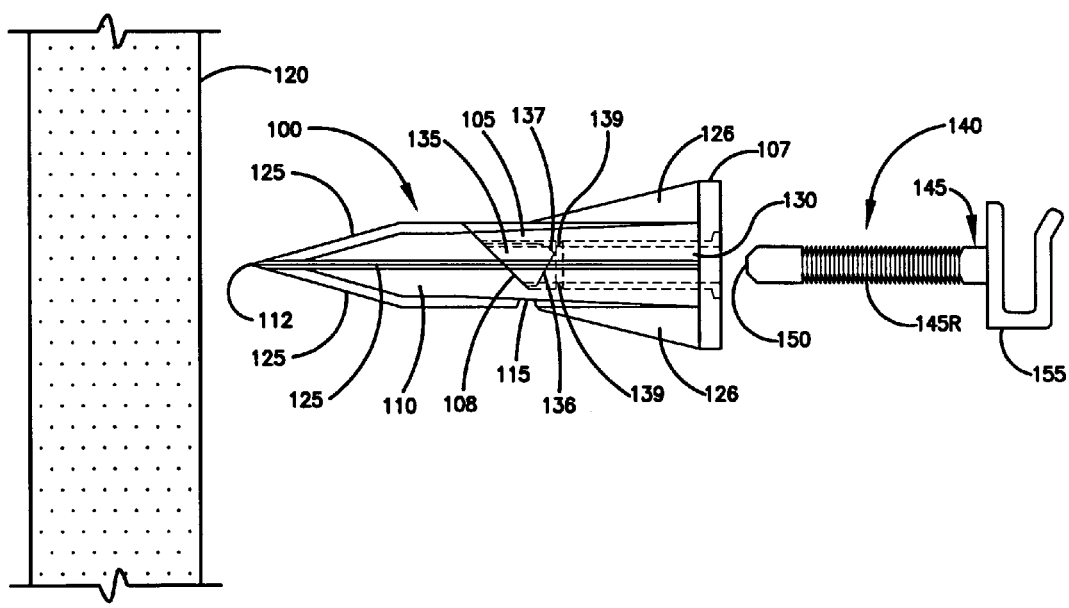
FIGS. 1A-1C show several views of a first embodiment of the fastening system with one pivotable section in accordance with the invention.

| 100 | Fastener | 105 | Wall-anchor section | 107 | Head portion |
|---|---|---|---|---|---|
| 108 | Joint | 110 | Pivotable section | 111 | Ellipse |
| 112 | Tip | 115 | Hinge | 120 | Wallboard |
| 125 | Fin | 126 | Fin | 130 | Bore |
| 135 | Projection | 136 | End | 137 | Edge |
| 139 | Locking tooth | 140 | Pin | 143 | Ratchet notches |
| 144 | Large threads | 145 | Shaft | 150 | Tip |
| 155 | Fixture | 200 | Threads | 400 | Cusp |
| 405 | Cusp | 410 | Hinge | 420 | Hinge |
| 520 | Pivotable section | 522 | Pivotable section | 524 | Pivotable section |
| 526 | Pivotable section | 600 | Fastener | 602 | Arm |
| 604 | Arm | 605 | Gear | 607 | Body |
| 610 | Gear | 615 | Pivot | 620 | Pivot |
| 630 | Half-tip | 635 | Half-tip | 640 | Pin |
| 645 | Rack | 650 | Tip | 700 | Fastener |

-continued

| REFERENCE NUMERALS | | | | | |
|---|---|---|---|---|---|
| 705 | Wall-anchor section | 710 | Fin | 715 | Head portion |
| 720 | Pivotable section | 725 | Tip | 730 | Locking part |
| 735 | Projection | 740 | Hinge | 745 | Notch |
| 746 | Bump | 750 | Bore | 755 | Bore center |
| 760 | Bore extension | 765 | Thread | 770 | Drill tip |
| 775 | Screwdriver | 780 | Arrow | 785 | Pointer |

First Embodiment

Description—FIGS. 1A through 1G

Figure 1B:
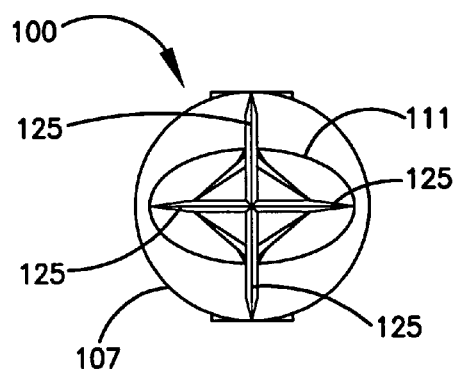
Figure 1C:
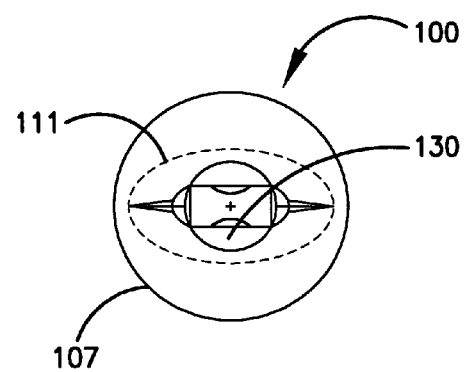
Figure 1H:
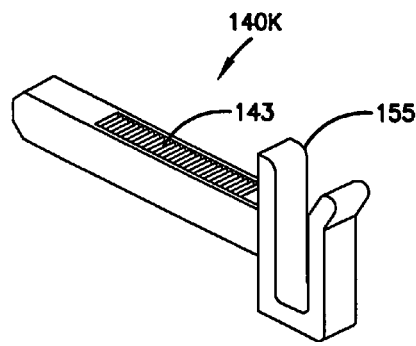
Figure 1H:
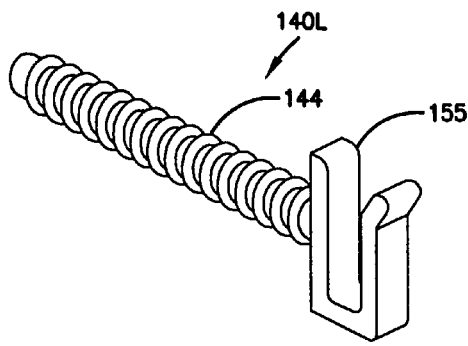
Figure 1H:
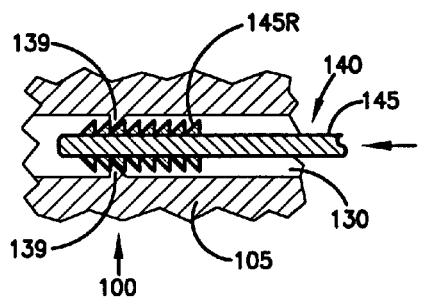
Figure 1H:
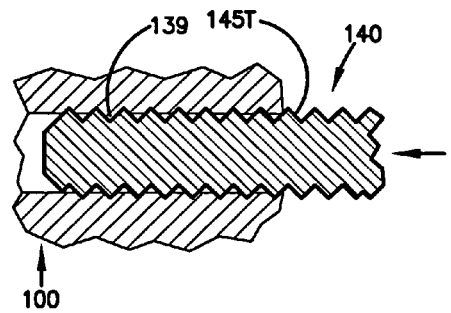
Figure 1H:
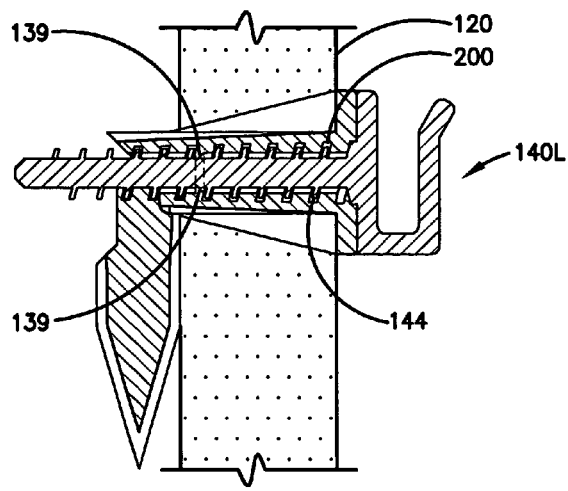

FIGS. 1A through 1C respectively show side, front, and rear views of a first embodiment of the fastener of the invention in its initial configuration. Fastener 100 is to be driven into a wall 120 (FIG. 1A) that has a hollow space behind (to the left of) the wall. Fastener 100 comprises a wall-anchor section 105 and a pivotable section 110, abutting at a joint 108 and joined by a hinge 115. Specifically, as best shown in the sectional views of FIGS. 2A to 2C, pivotable section 110 and wallboard section 105 are joined together by integral or "living" hinge 115 or pivot point at the bottom center of anchor 100. Also they are contiguous at joint 108 (FIG. 1A—indicated by the slanting line) where pivotable section 110 and wallboard section 105 are adjacent each other. Thus there is no gap between adjacent parts or surfaces of sections 110 and 105.

Hinge 115 is exemplary and can take the form of an integral or "living" hinge, strap, flap, lanyard, two-part hinge with a pin, or other type of connecting element. Pivotable section 110 terminates at its front end, distal from the user (not shown), in a sharpened tip 112. Note that tip 112 is coincident with the axis of the fastener. Wall-anchor section 105 terminates in a flattened head portion 107 at its rear or proximal end. The cross-section of sections 105 and 110 is preferably elliptical with the ratio of short and long axes equal to about 0.6, as indicated at 111 in FIGS. 1B and 1C. This ratio is exemplary and is determined by the present application. Other axial ratios and shapes can be used.

Optional fins 125 extend from tip 112 to the bottom side of head portion 107. Fins 126 extend from the outer edge of the bottom of head portion 107 down to fins 125 over the length of wall-anchor section 105. A round bore or cavity 130 extends axially through wall-anchor section 105. Alternatively, bore or cavity 130 can have elliptical, rectangular, and other shapes, as described below in connection with the preferred embodiment.

A projection 135 (FIG. 1A) is part of pivotable section 110 and extends into bore 130 a distance equal to or greater than the diameter of bore 130, temporarily lodging there. Projection 135 terminates in an angled end 136 and a rounded edge 137.

The length of section 105 from the bottom side of head 107 to the fulcrum of hinge 115 is preferably equal to the thickness of wall 120, generally between 1 and 2.5 cm. The length of tip section 110 is preferably about 2.5 cm. Thus the combined length of sections 105 and 110 is preferably about 4 cm. Other lengths can be provided, depending upon the thickness of the wall in which they are to be used.

Alternatively, a single-length fastener can be used for varying thicknesses of wallboard 120. This is described in more detail in connection with FIGS. 2F and 2G below.

The diameter of fastener 100 is nominally about 7 mm. The diameter of bore 130 is preferably about 4 mm. These diameters can vary depending on the load to be supported by the fastener, and the size of hole and ease of penetration desired. Bore 130 contains a locking tooth or ring 139, which may be a single tooth placed on the top, bottom, or sides of bore 130. Alternatively, it may comprise a ring or annulus around the entire circumference or any portion thereof, locally narrowing the diameter of bore 130 to about 3.5 mm. Locking tooth 139 engages ridges comprising threads, or notches in pins 140A-140L (FIGS. 1D-A through 1D-J, 1E-A, and 1E-B) as described below. The thickness of head section 107 is preferably about 1 mm.

Fastener 100 is preferably made of a plastic such as nylon, but many other materials are suitable, including other plastics, metals, and hardwood.

A pin 140, which generally includes either a notched, ratcheted, or threaded shaft 145, is preferably supplied with fastener 100. Pin 140 activates fastener 100 when it is fully inserted through bore 130. Shaft 145 terminates in a chamfered tip 150 on one end and an attachment fixture 155, such as a hook, screw head, bolt, etc. at the other end.

Pin 140 is preferably made of nylon, but other materials can be used, including other plastics, metal, and wood. In the preferred embodiment the anchor is supplied with pins with multiple different heads and designed to work with anchor 100.

Various embodiments of pin 140 are shown in FIGS. 1D and 1E. They are all designed to work with anchor 100 and can be screws or bolts with threads 145T, as in FIGS. 1D-A through 1D-E, pins with notches 145R and various-shaped heads, including flat heads, screw heads, bolt heads, and hooks as in FIGS. 1D-F through 1D-J, pins with a non-circular cross-section and ratchet notches 143 as in FIG. 1E-A, or large threads 144 as in FIG. 1E-B. The interior of bore 130 is configured to accommodate at least one and possibly many pin shaft designs, including large or small threads, notches, other-than round cross-sections, and various diameters.

FIG. 1F shows a detail of locking tooth 139 in bore 130 of fastener 100 engaging ratchet teeth 145R on pin shaft 145. Ratchet teeth 145R are shown in FIGS. 1A and 1D-F through 1D-J. In FIG. 1A teeth 145R are formed around the entire circumference of shaft 145 of pin 140. In FIGS. 1D-F through 1D-J, teeth 145R are optionally formed around less than the entire circumference of shaft 145 of pins 140. Ratchet teeth 143 are shown on at least one side of pin 140K in FIGS. 1E-A. Pin 140 is inserted into bore 130 of fastener 100, then pushed in the direction of the arrow. Ratchet teeth 145R flexibly transit inward by slightly bending locking tooth 139 and ratchet teeth 145R along their respective ramped surfaces as pin 140 is pushed in the direction of the arrow. However, when pin 140 is urged in the opposite direction, the parallel faces of teeth 145R and tooth 139 meet. Since they are buttressed by the material forming the ramp on the opposite side of their parallel faces, the teeth are far less flexible when urged in the direction opposite that of the arrow. Thus as pin 140 is inserted into fastener 100, teeth 145R forcibly engage locking ring 139, preventing withdrawal of pin 140.

FIG. 1G shows a detail of threads 145T on pin shaft 145 engaging bore 130 of fastener 100. (Threads 145T are relatively small when compared with threads 144, discussed above.) The outer diameter of threads 145T is approximately 10 percent larger than the inner diameter of bore 130. Thus threads 145T cut into the material of fastener 100 as pin 140 is screwed into bore 130 in the direction of the arrow. Threads 145T forcibly displace the material in locking ring 139 as pin 140 progresses inward, largely obliterating it. This displacement increases frictional forces between threads 145T and the material that previously constituted ring 139 over that between threads 145T and the remainder of bore 130. Thus the threaded design of pin 140 is again firmly secured in fastener 100.

Figure 2A:
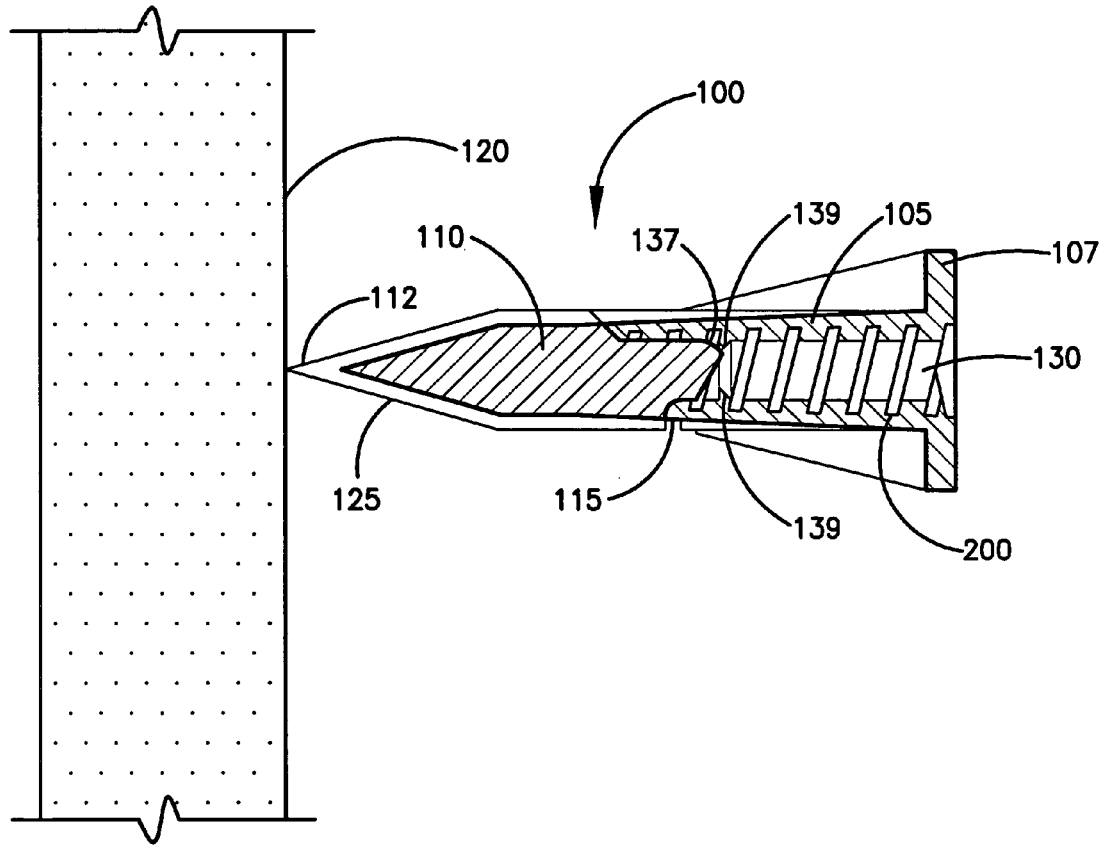
FIGS. 2A-2G are cross-sectional views of the first embodiment, illustrating how this embodiment of the fastening system is installed in a wall or ceiling.
Figure 2B:
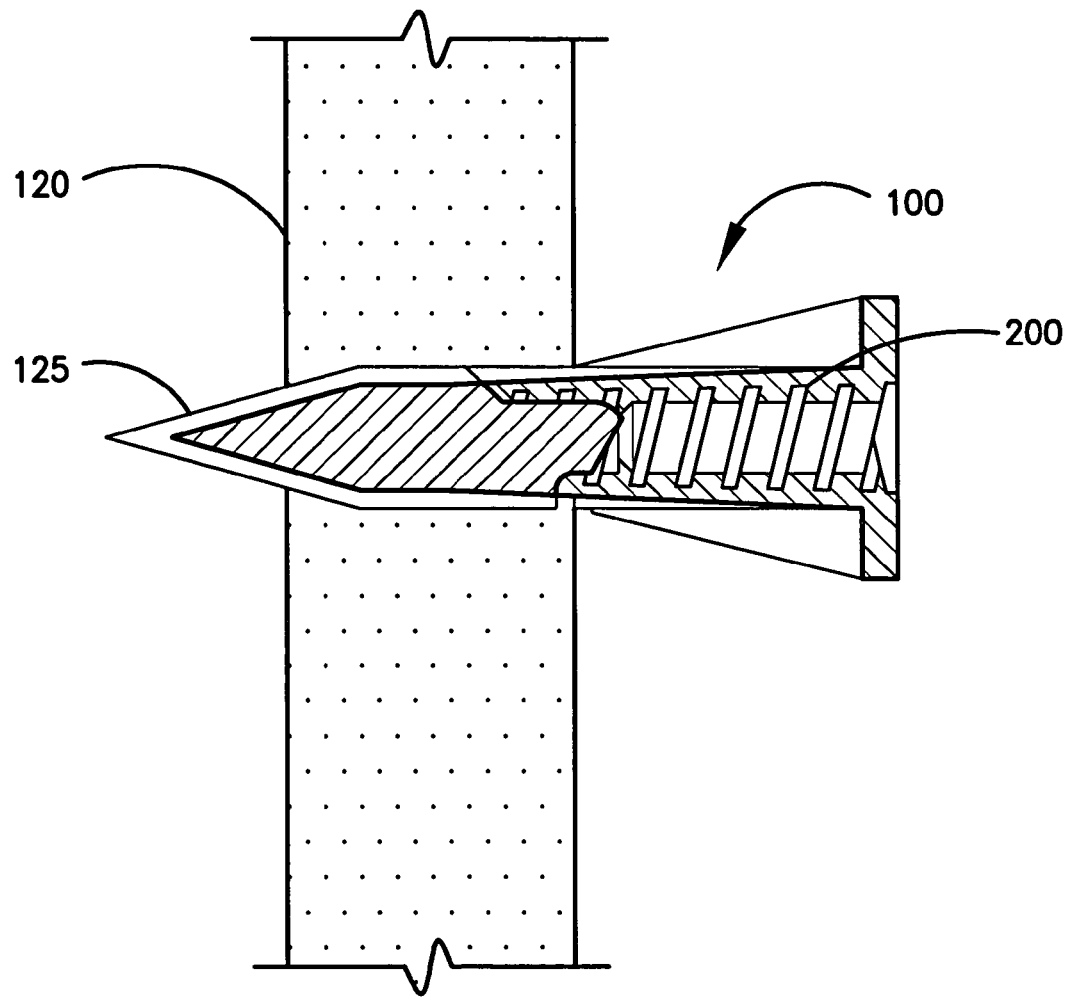
Figure 2C:
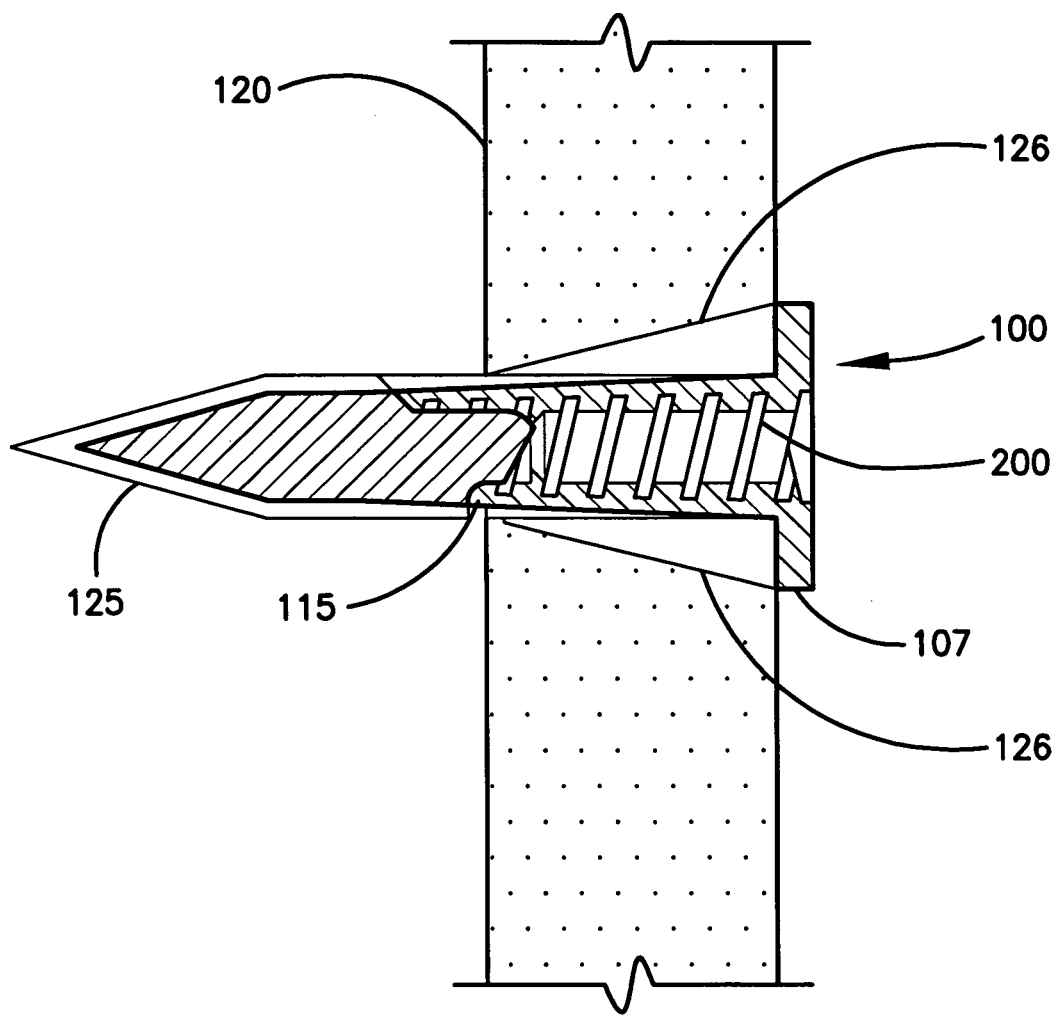
Figure 2D:
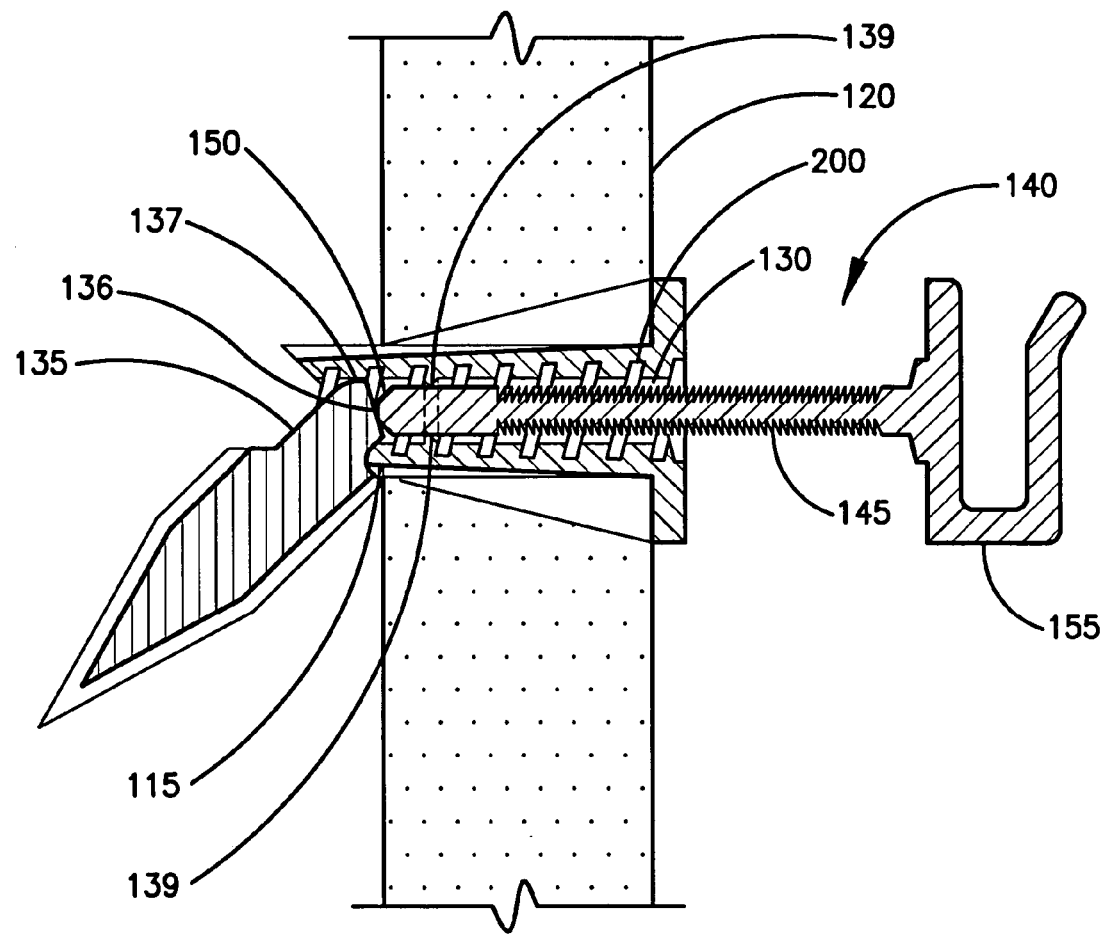
Figure 2E:
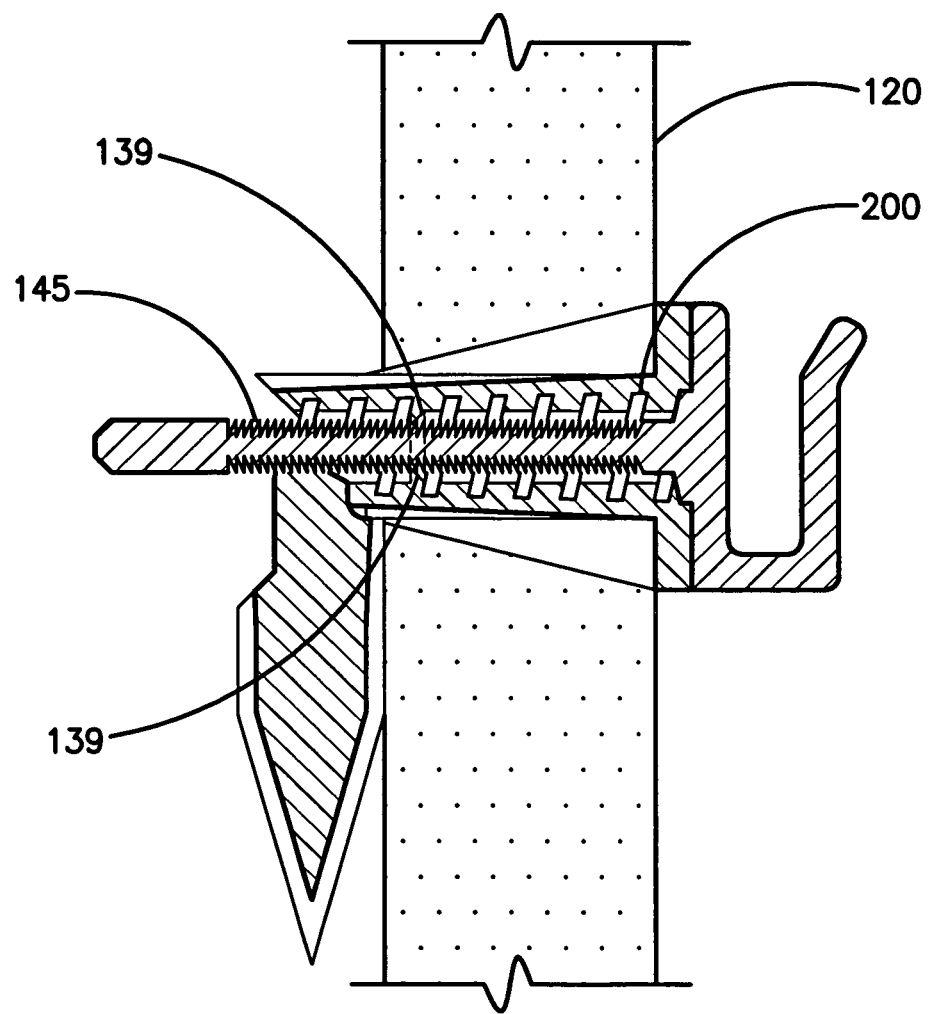
Figure 2F:
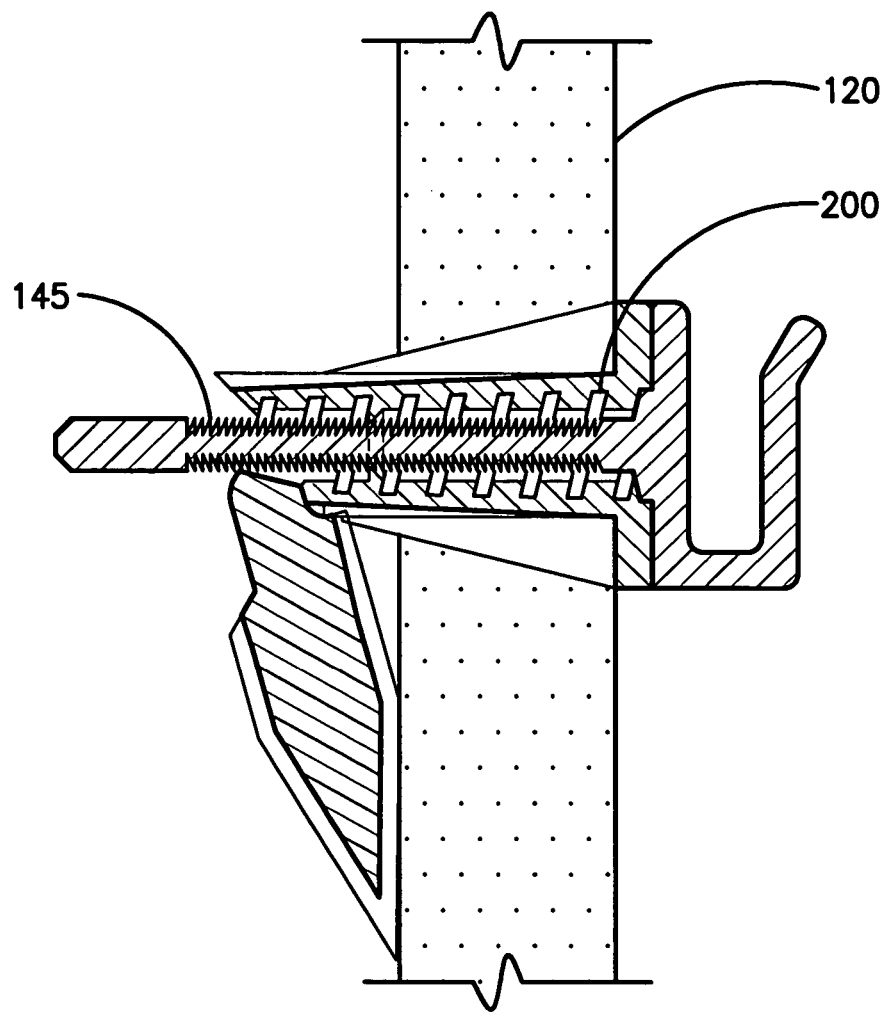

As stated, FIGS. 2A-2G show a cross-sectional views of fastener 100. Fastener 100 is supplied with rear fixed section 105 and front and pivotable section 110, as shown in FIG. 2A. If sections 105 and 110 have been bent out of axial alignment, i.e., they form an angle with respect to each other (not shown), the user should bend them so that their axes are aligned.

First Embodiment

Operation—FIGS. 2A through 2G—Preparation

FIGS. 2A-2G show a cross-sectional views of fastener 100. Fastener 100 is supplied with rear fixed section 105 and front and pivotable section 110, as shown in FIG. 2A. If sections 105 and 110 have been bent out of axial alignment, i.e., they form an angle with respect to each other (not shown), the user should bend them so that their axes are aligned.

When the sections are aligned, edge 137 frictionably rubs against the surface of bore 130. Resilience in hinge 115 permits rubbing contact of these two surfaces. If sections 105 and 110 come out of axial alignment or have been bent out of axial alignment, and then they are bent back into alignment in preparation for inserting, edge 137 moves over bore 130 with a snapping action. This snapping action causes fastener 100 to remain rigidly straight, with no gap between the mating surfaces of sections 105 and 110, while it is driven into wallboard 120. This rigidity prevents wandering of tip 112 as fastener 100 enters wallboard 120.

Alternatively, sections 105 and 110 can be fused at the time of manufacture to make joint 108 (FIG. 1A) friable; it is later broken by insertion of pin 140, as described below. If fastener 100 is made of a flexible material such as plastic, sections 105 and 110 will add resilience by flexing slightly.

Insertion

Fastener 100 is next oriented so that the major axis of its elliptical cross-section 111 (FIGS. 1B and 1C) is horizontal. This orientation reduces load-responsive pressure within wallboard 120 and minimizes the area in wallboard 120 disturbed by fastener 100. Fastener 100 is then driven into wallboard 120 by a hammer (not shown), or other blunt instrument or a thumb. Hammer blows are applied to the outer surface of head 107 in a direction parallel to the axis of fastener 100. Alternatively, fastener 100 can be inserted into a drilled or punched hole (not shown) in wallboard 120. In this case, the diameter of the hole is preferably less than or equal to the smallest diameter of section 105.

As fastener 100 enters wallboard 120 (FIG. 2B), optional fins 125 precisely preserve the horizontal orientation of elliptical cross-section 111 (FIGS. 1B, 1C). If fins 125 are absent, elliptical cross-section 111 will prevent rotation of anchor 110 once the body of tip portion 110 enters wallboard 120.

Because there is no gap between adjacent edges of sections 110 and 105, i.e., they are contiguous, the anchor will hold its configuration as it is hammered into the wall. Thus the distal and proximal sections will remain in their initial configuration as shown in FIG. 1A and will not separate or pivot with respect to each other. In contrast, some prior-art anchors had a gap between the wall anchor section and pivotable sections, so that when the anchor was hammered into the wall, its parts often separated, damaged the wall, and the entire anchor had to be replaced.

FIG. 2C shows fastener 100 fully embedded in wallboard 120. The bottom side of head 107 rests firmly against the outer surface of wallboard 120. As they enter wallboard 120, fins 126 preserve the previously determined orientation of fastener 100. When fastener 100 is fully inserted, fins 126 and the elliptical cross-section of sections 105 and 110, indicated at 111 in FIGS. 1B and 1C, also prevent its rotation under load or when torque is applied to fastener 100, for example when a large screw is installed into bore 130.

When fastener 100 is fully inserted (FIG. 2C), hinge 115 is positioned at the inner surface of wallboard 120. The distance between the lower surface of head 107 and hinge 115 is selected according to the thickness of wallboard 120. Wallboard 120 is supplied in standard thicknesses ranging from 1.27 cm through 2.54 cm in the U.S. Thus fastener 100 is also supplied with various hinge-head distances to fit these thicknesses.

Alternatively, section 105 of fastener 100 can be supplied in a single length for use with a range of thicknesses of wallboard 120, as described below.

Activation

In order to lock the inserted fastener into the wallboard, pin 140 is inserted (FIG. 2D) into bore 130 of fastener 100. Pin 140 is manually inserted until tip 150 impinges on edge 136. In lieu of the pin shown in FIG. 2D, any of the other pins shown in FIGS. 1D and 1E can be used, provided they are configured to correctly mate with the anchor.

In the case of a notched or ratcheted shaft (140F through 140K, FIGS. 1D-1E), further insertion force is normally provided by a user's thumb. In the case of threaded shafts (140A-140E, 140L, FIGS. 1D-1E), the user's hand or a screwdriver or wrench (not shown) are used. In both cases threads 145T, 144 or notches 145R, 143 engage and are held in place by locking tooth 139 in bore 130, as explained above. Alternatively, threads 145T and 144 can be held in part by locking tooth 130. These threaded pins also use the threads to cut into the material that comprises anchor body 105 from inside bore 130, thereby securely engaging the threads into the anchor material and securing locking pin 140 in place, also as explained above. The required insertion force is minimal since tip section 110 does not interfere with or displace the material in wallboard 120. Only the detent formed by sliding interference of edge 137 of projection 135 and bore 130 must be overcome. The resilience of hinge 115 permits this sliding to occur.

Forcing tip 150 of pin 140 against edge 136 produces a counter-clockwise (CCW) moment of torque about hinge 115, i.e. tip 150 cams edge 136, which acts as a cam follower, causing tip or pivotable section 110 to rotate CCW (FIG. 2D) until it finally rests firmly against the inner surface of wallboard 120 (FIG. 2E). The anchor is now in its activated or expanded configuration and is locked in and onto the wallboard. I.e., with pin 140 in place, held securely by threads 145T, 144, or notches 145R, 143, and locking tooth 139, fastener 100 is firmly and securely emplaced in wallboard 120.

Now a picture, mirror, etc. (not shown) can be hung on the hook of pin 140 and the anchor will resist pullout due to the locking action provided by pivotable section 110. If the pin has no hook, such as pins 140A to 140E, of FIGS. 1D-A through 1D-E, it can be first fully inserted into fastener 100, activating it, then withdrawn on the order of 2 mm to permit hanging a wire (not shown) on the shaft of the pin. This small withdrawal distance will not de-activate fastener 100.

If section 105 of fastener 100 is supplied in a single length for use with a range of thicknesses of wallboard 120, the following two cases apply. In the first case, shown in FIG. 2F, the length of section 105 is greater than the thickness of wallboard 120. Projection 135 is sufficiently long that pin 140 is in contact with edge 136 (FIG. 1A) as tip section 110 executes an arc greater than 90 degrees, finally pressing against the inside surface of wallboard 120.

Figure 2G:
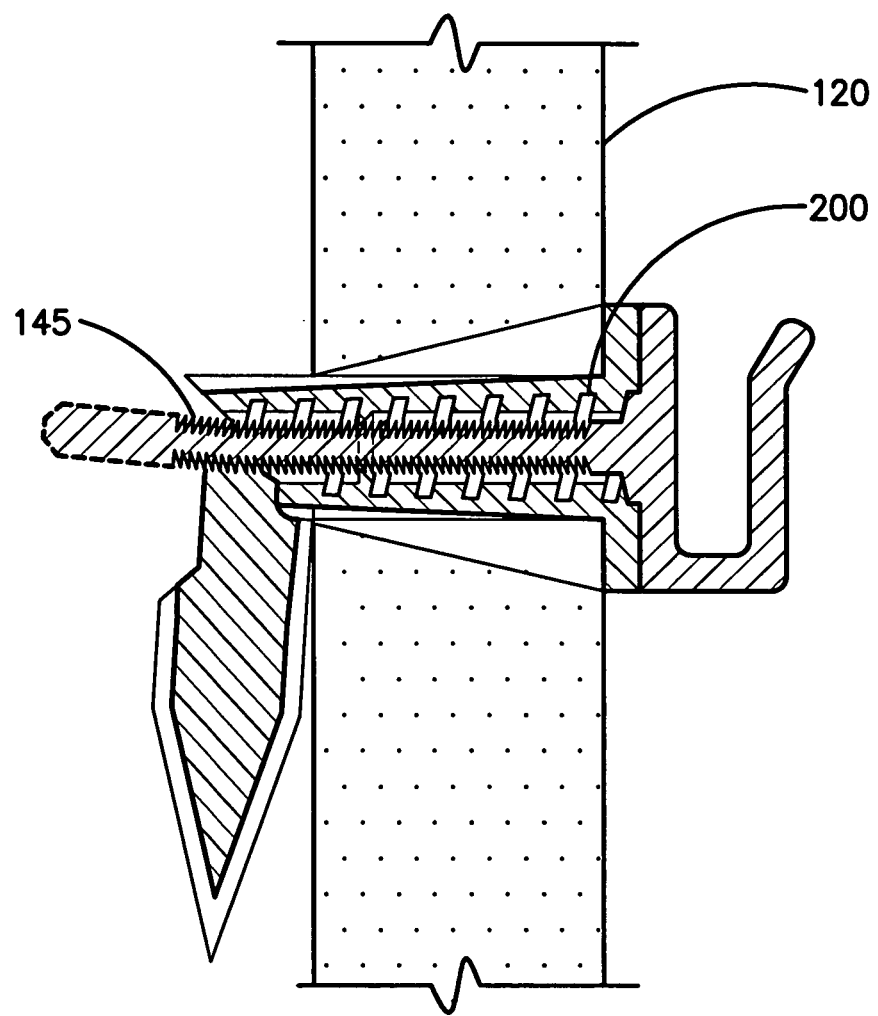

In the second case, shown in FIG. 2G, the length of section 105 is less than the thickness of wallboard 120. Projection 135, hinge 115, and pin 140 are sufficiently flexible that pin 140 bends slightly and pushes past projection 135, causing section 110 to wedge against the inner surface of wallboard 120.

An additional benefit derives from the oval or elliptical cross-section of fastener 100. This non-circular shape permits greater rotational torque to be applied to pin 140 than possible with a circular shape, thus reducing rotational blowout.

FIGS. 1E-G show pin 140L, with threads 144, inserted into bore 130 of fastener 100 (FIG. 2A) and rotated or screwed in to cause male threads 144 to engage female threads 200 within fastener 100, thereby activating it.

The present fastener accommodates a variety of sizes and styles of pins, whereas prior-art fasteners generally require a predetermined size and style, i.e. threads of a certain diameter and pitch.

Second Embodiment

Figure 3A:
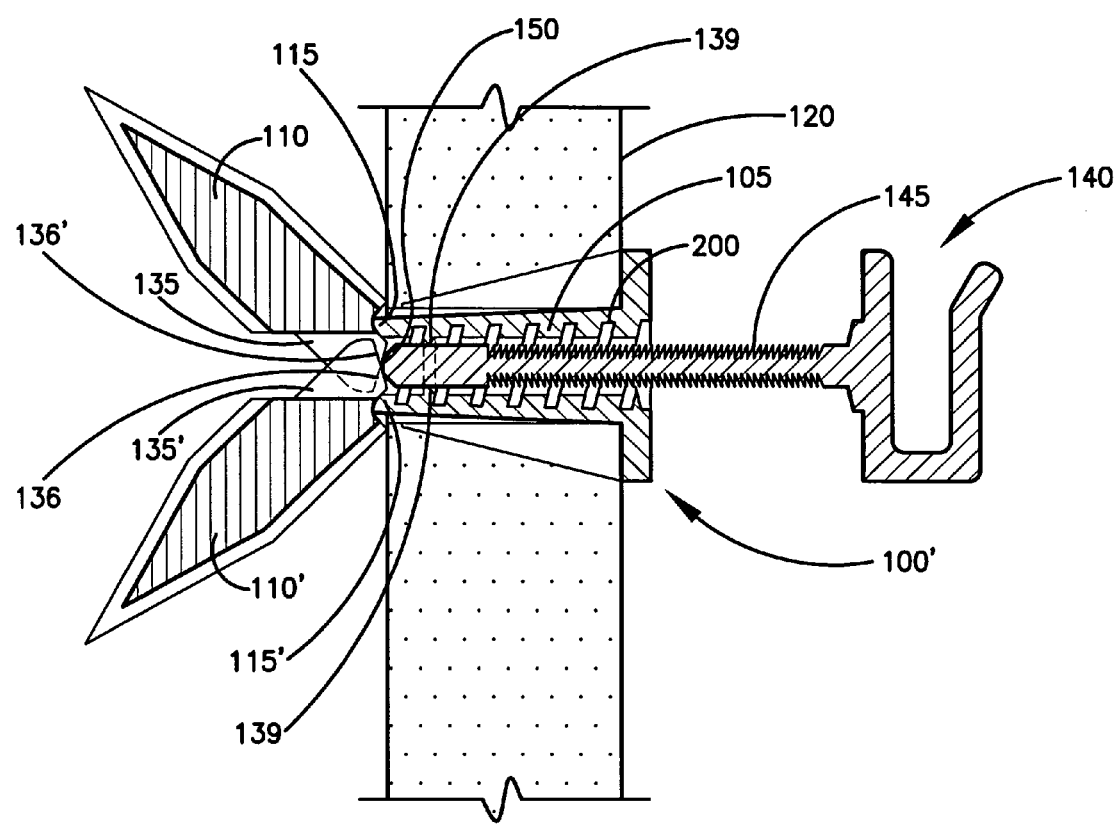
FIGS. 3A and 3B illustrate how another embodiment of the fastening system, with multiple pivotable sections, is installed in a wall or ceiling.
Figure 3B:
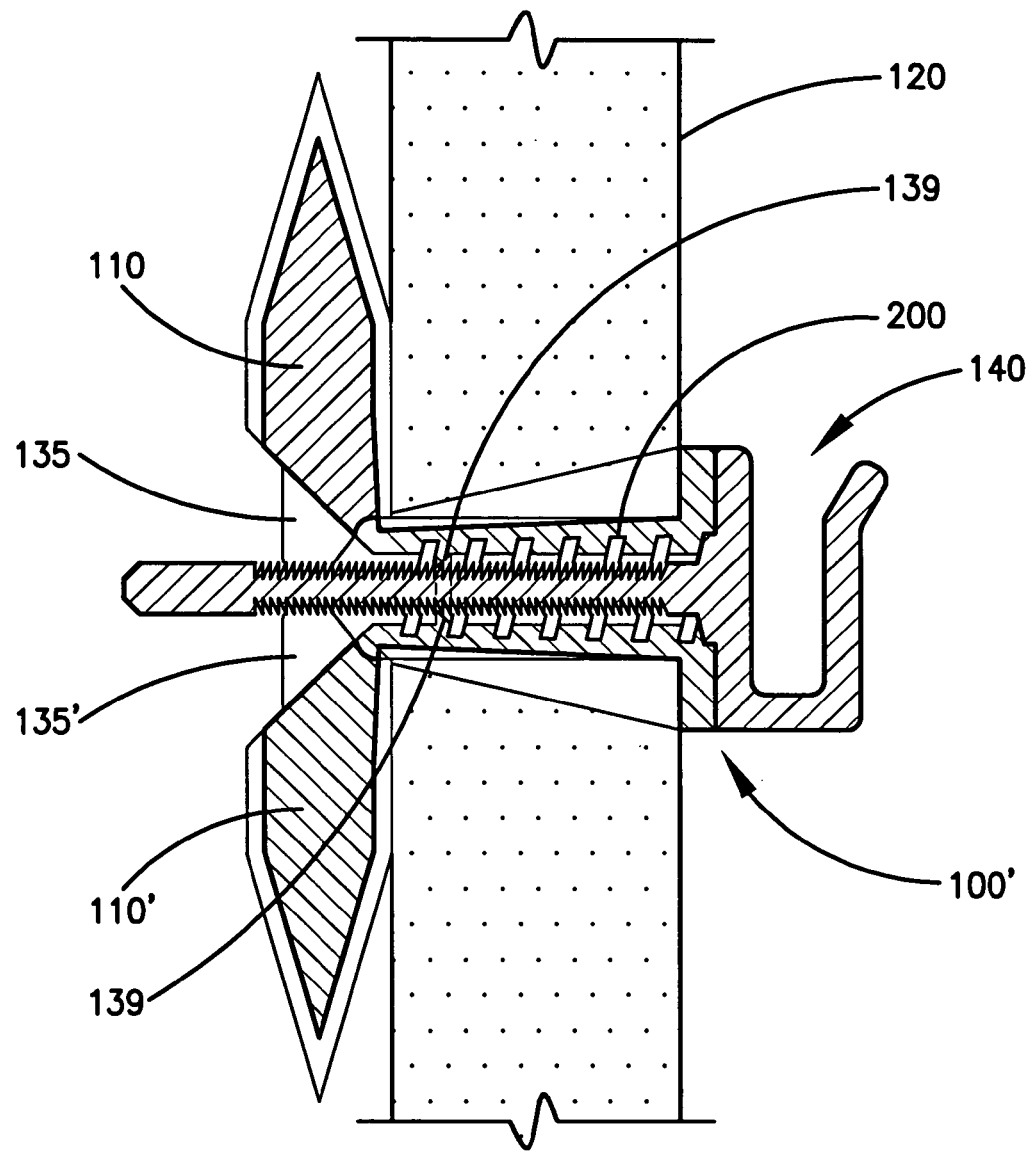
Figure 4A:
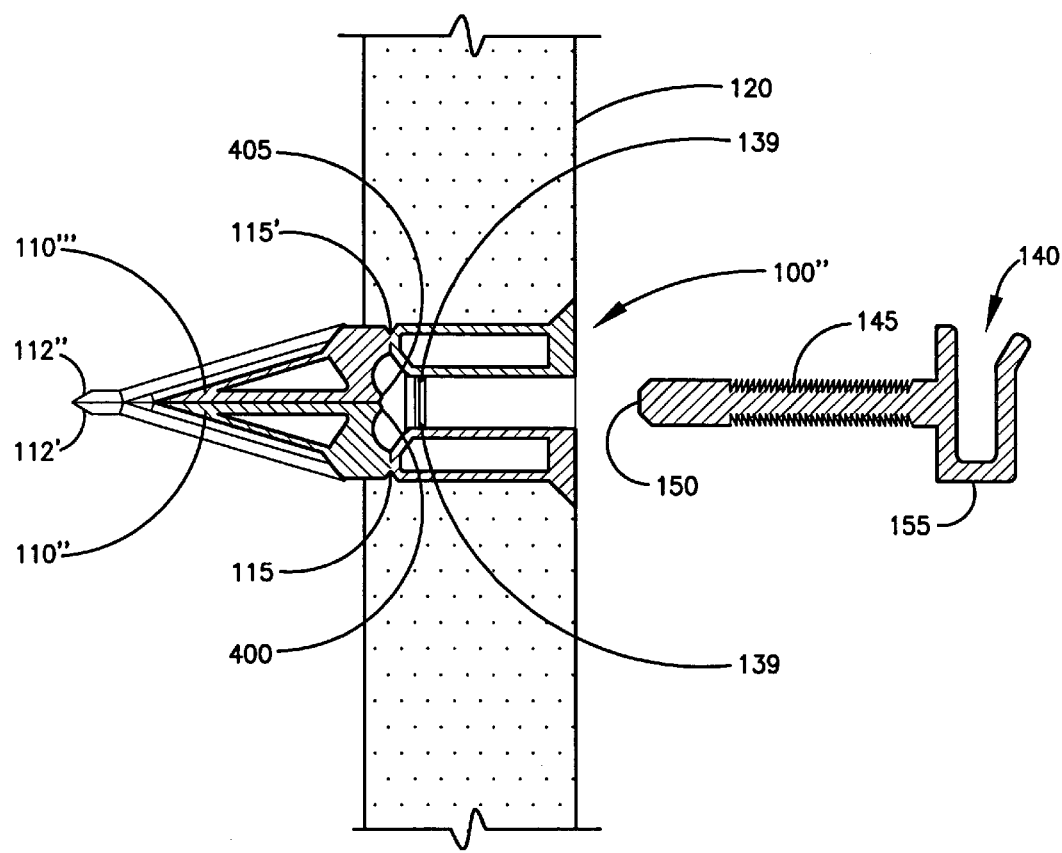
FIGS. 4A and 4B are pre-pivoting and post-pivoting views illustrating yet another embodiment of the invention.
Figure 4B:
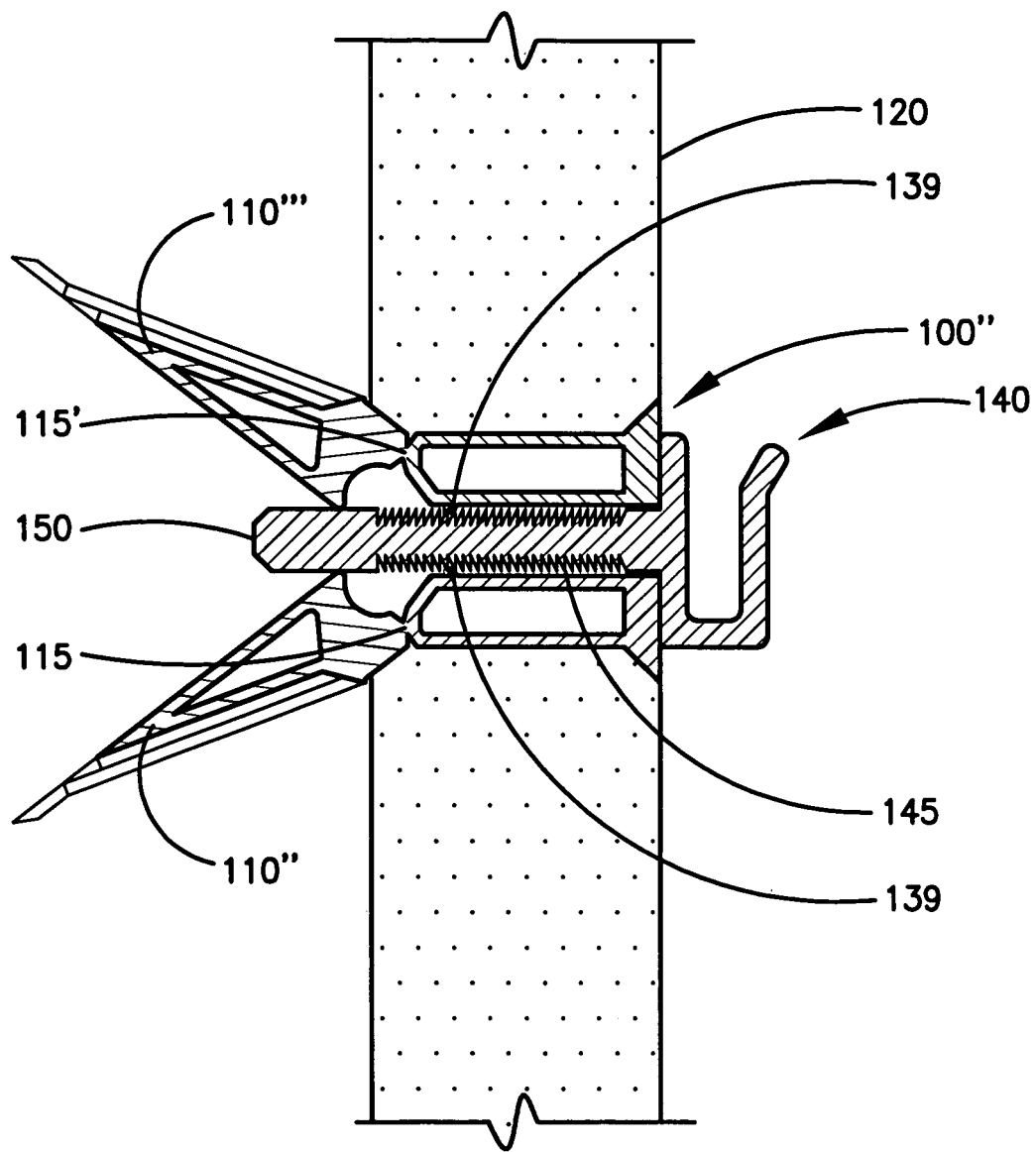

Description and Operation—FIGS. 3A-3B

A second embodiment (FIG. 3) employs two pivoting tip sections 110 and 110'. By employing two such sections, this embodiment engages a larger area of wallboard, resulting in a stronger anchor. Each of sections 110 and 110' is joined to wall anchor section 105 by hinges 115 and 115' respectively, as described above in connection with the preferred embodiment. When urged by tip 150 of pin 140, the force against edges 136 and 136' of projections 135 and 135' form moments of torque around their respective hinges, causing section 110 to pivot upwardly and 110' to pivot downwardly (FIG. 3A).

When pin 140 is fully inserted in fastener 100', sections 110 and 110' rest firmly against the inside of wallboard 120, and ratchet teeth or notches 145R or 143 (FIGS. 1D and 1E) are held by locking tooth 139, thereby securely embedding fastener 100.

A picture or other weight hung on the proximal end or hook of pin 140 will urge the front or distal end of fastener 100' to tend to rotate clockwise as shown in FIG. 3B. However tip section 110 prevents fastener 100' from rotating by exerting force on the inside surface of wallboard 120. Any counter-clockwise torque exerted on tip section 110 causes the distal end of pin 140 to be yet more firmly clamped between projections 135 and 135'. The result is a fastener which becomes more secure as weight is hung on pin 140.

Third Embodiment

Description and Operation—FIGS. 4A, 4B, and 5A-5C

In a third embodiment (FIG. 4), fastener 100", employs two pivoting sections 110" and 110'". This embodiment is useful when the thickness of wallboard 120 is such that hinges 115 and 115' will lie within wallboard 120. In this case sections 110" and 110'" comprise a wedge which locally compacts and strengthens wallboard 120 beneath them as they are spread. Sections 110" and 110'" form a symmetrical pair. When fastener 100" is driven into wallboard 120, half-tips 112' and 112" are pressed together with no intervening gap and act as a single unit, guiding fastener 100" in a straight path through wallboard 120.

Sections 110" and 110'" terminate at cusps 400 and 405, opposite half-tips 112' and 112". As pin 140 is inserted into fastener 100", tip 150 pushes against cusps 400 and 405, causing sections 110" and 110'" to pivot around hinges 115 and 115'. When pin 140 is fully inserted, pivoting sections 110" and 110'" are forced outward from the axis of fastener 100" and ratchet teeth or notches 145R or 143 (FIGS. 1D and 1E) are held in place by locking tooth 139, whereby fastener 100" is wedged firmly in place in wallboard 120.

Figures 5A, 5B, 5C:
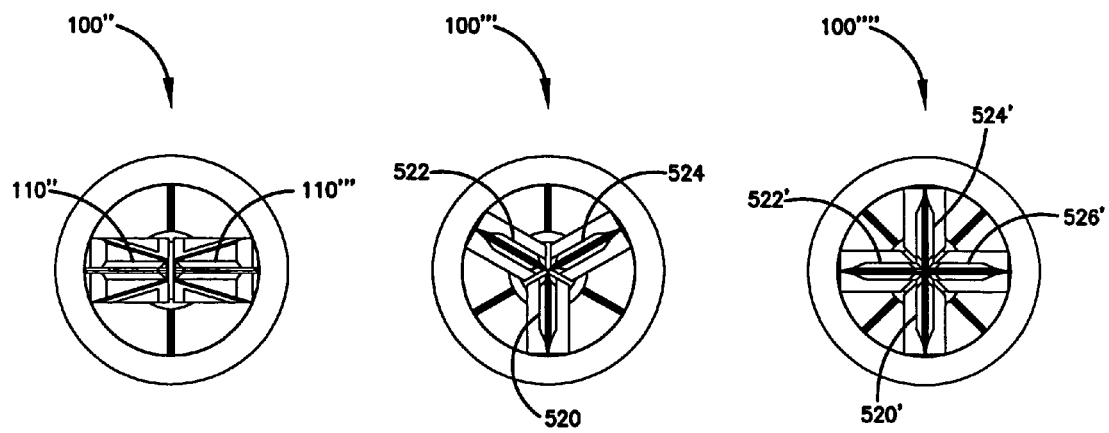
FIGS. 5A-5C are pre-pivoting tip views of three embodiments with two pivotable sections, three pivotable sections, and four pivotable sections, respectively, in accordance with the invention.

Instead of two pivotable sections (110" and 110'"), three or more pivotable sections can be used. FIG. 5A shows a tip-end view of fastener 100", like that of FIGS. 4A and 4B. FIGS. 5B and 5C are tip-end views showing three and four pivotable sections 520, 522, 524, and 520', 522', and 524', respectively. Although circular cross-sections are shown, this embodiment can also have an elliptical cross-section.

Fourth Embodiment

Figure 6A:
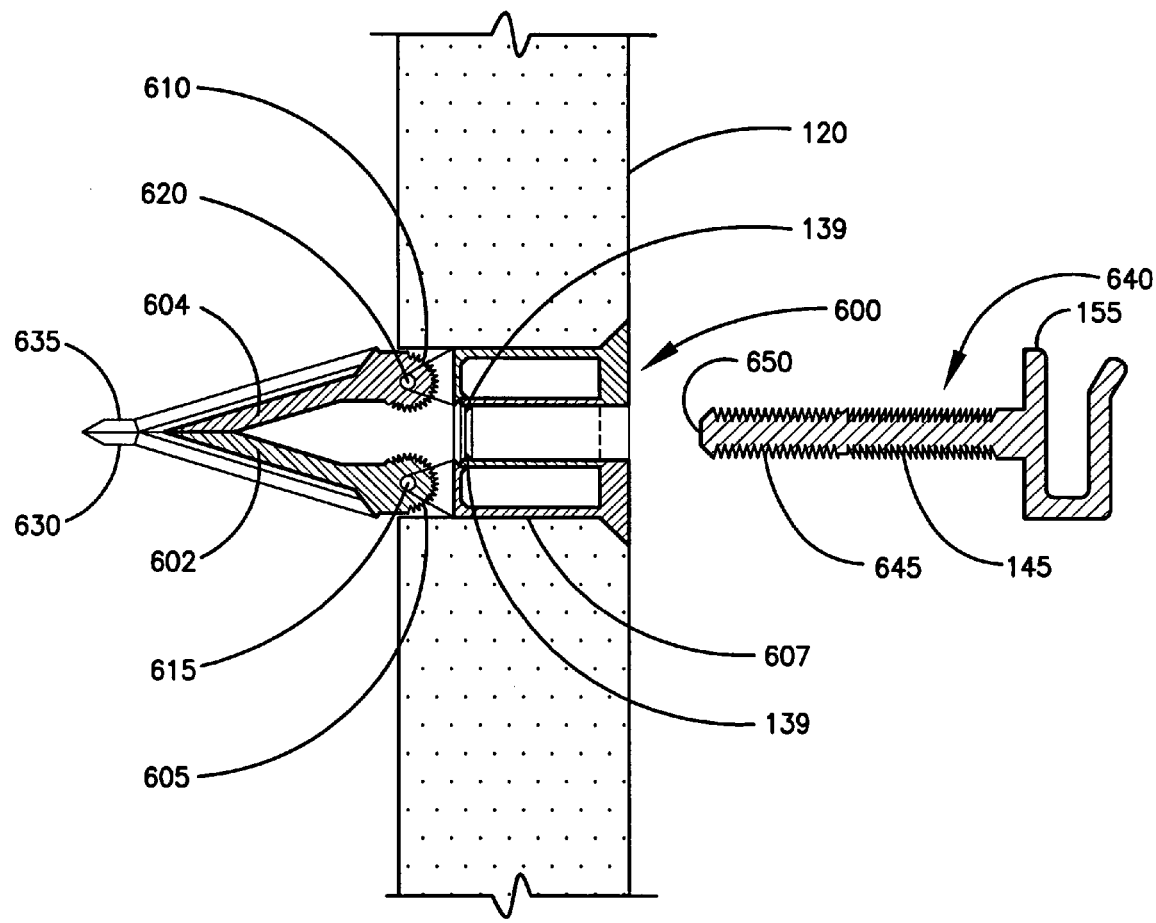
FIGS. 6A and 6B show yet another embodiment of the fastening system in accordance with the invention.
Figure 6B:
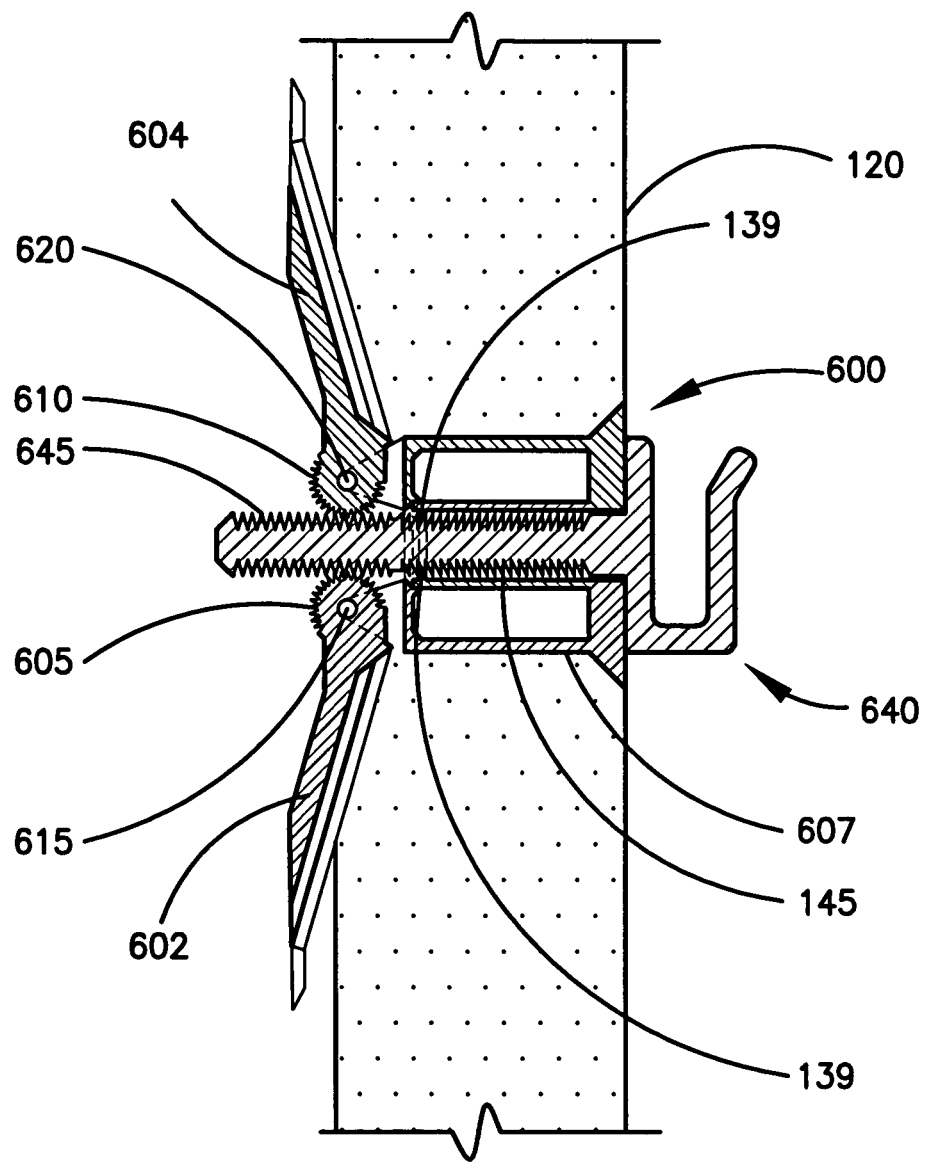

Description and Operation—FIGS. 6A and 6B

In This Embodiment (FIG. 6), Hinges Are Not Used. Instead, Two Pivoting Sections Are caused to rotate about pivots, which hold respective pinion gears that are rotated by a rack (straight gear) on the inserted pin. Fastener 600 is fitted with two arms 602 and 604, having pinion gears 605 and 610 at one end. Gears 605 and 610 are mounted adjacent wall fastener body 607 on pivot axles 615 and 620.

Pin assembly 640 includes a rack 645 adjacent its tip 650, and ratchet teeth or notches 145R or 143 (FIGS. 1D and 1E).

Anchor 600 is driven into wallboard 120, guided by half-tips 630 and 635, as described above. Then pin assembly 640 is inserted (FIG. 6B) into bore 650 of fastener 600. As pin 640 is inserted, rack 645 engages pinions 605 and 610, causing arms 602 and 604 to pivot outward, away from the axis of fastener 600. When pin 640 is fully inserted, arms 602 and 604 are wedged firmly against the inner surface of wallboard 120, and ratchet teeth or notches 145R (143) are held in place by locking tooth 139, resulting in a secure anchoring of fastener 600.

This embodiment is easily removed from a wall. Withdrawing pin 640 results in the re-alignment of arms 602 and 604, enabling withdrawal of anchor 600.

Preferred Embodiment

Description and Operation—FIGS. 7A through 7I

Figure 7A:
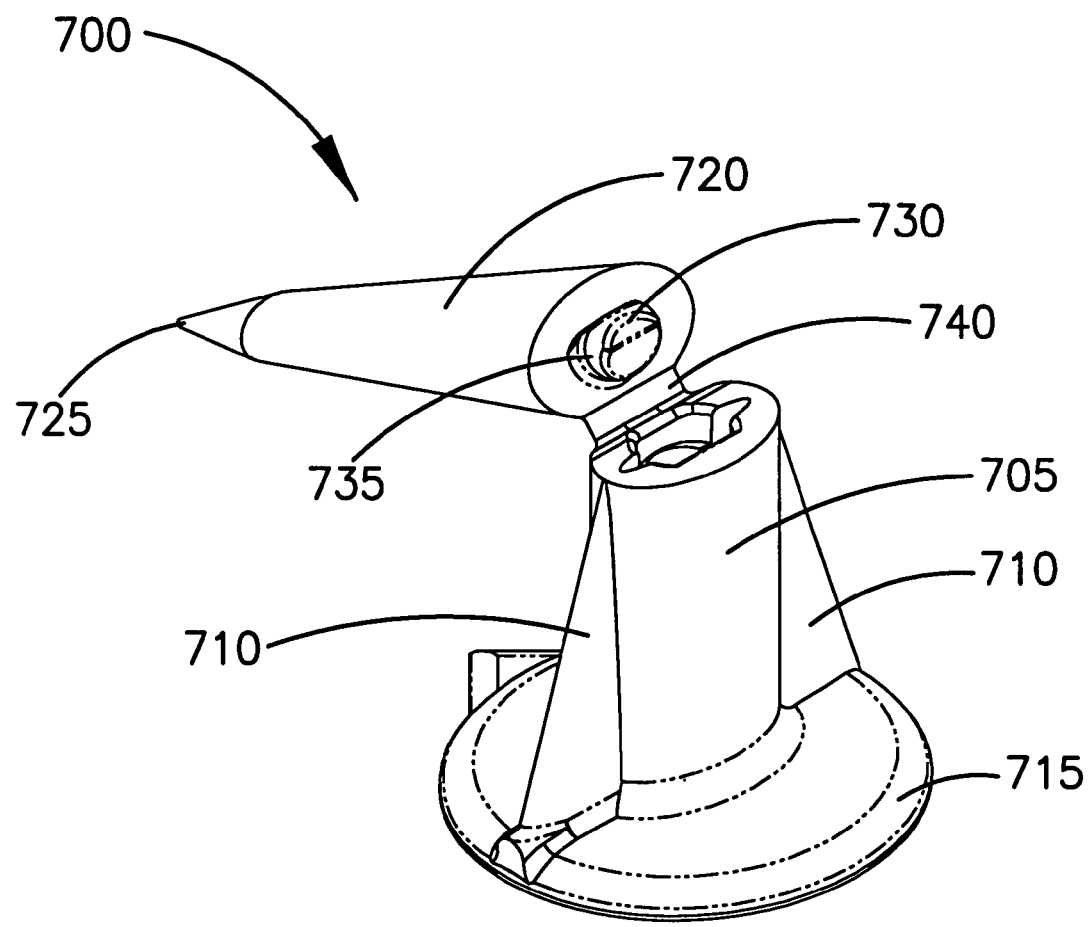

A fastener according to a presently preferred embodiment is shown in perspective in FIG. 7A. A wall-anchor section 705 of fastener 700 comprises a body with a pair of fins 710, and a head portion 715. A pivotable section 720 comprises a sharpened tip 725 and a locking part 730 (FIG. 7B) on a projection 735. Note that the external surface of pivotable or distal section 720 is smooth and tapered and has no fins. Only wall-anchor or proximal section 705 has fins. Sections 705 and 720 have a tapered, elliptical cross-section and are joined by a living hinge 740. As explained above in connection with the first embodiment, hinge 740 can alternatively take the form of a strap, flap, lanyard, two-part hinge with a pin, or other type of connecting element. Note that the facing or mating surfaces or sections 705 and 720 are encircling, annular, or endless bands which surround projection 735 and are perpendicular to the axis of the anchor when it is in its straight configuration. Hinge 740 is outside these mating surfaces.

Fastener 700 is preferably made of plastic, although other materials can be used, as explained above. Two suitable plastics are sold under the trademarks "Nylon 6" and "Nylon 66 Super Tough" by E.I. DuPont de Nemours Company, Wilmington, Del., U.S.A.

Figure 7B:
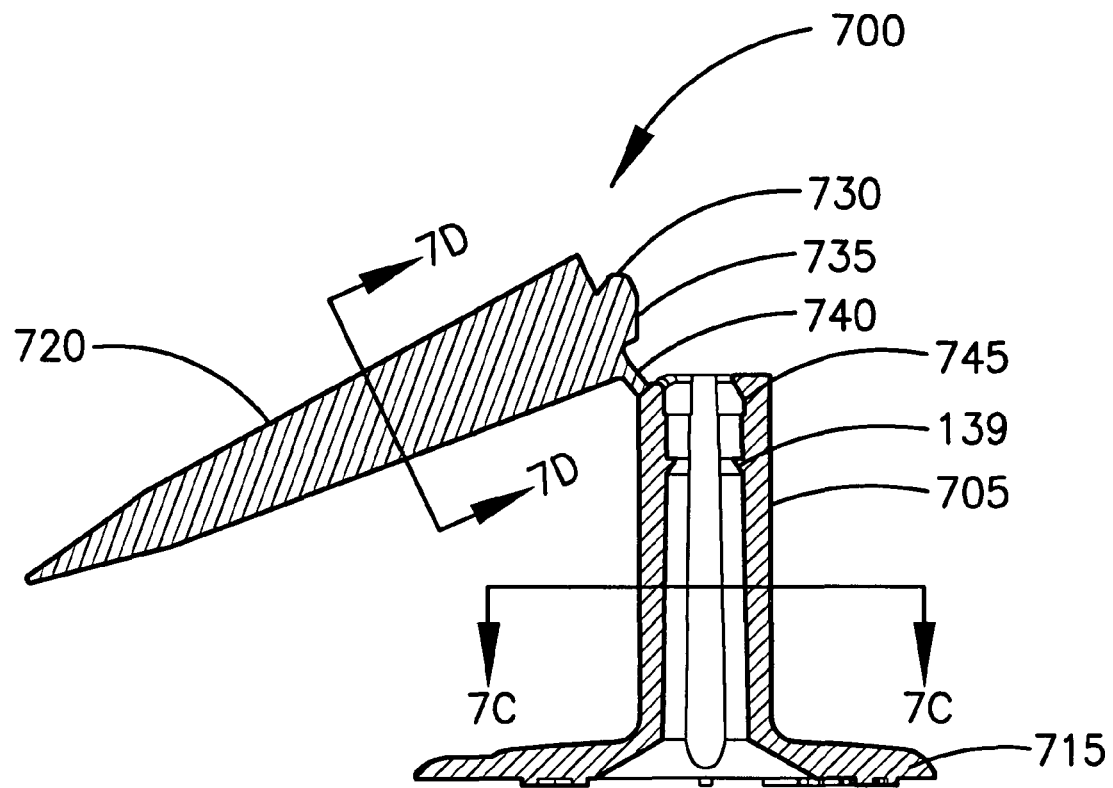

FIG. 7B is a cross-sectional view of fastener 700. A notch or catch 745 inside section 705 receives and captures locking part 730 on projection 735 when sections 705 and 720 are axially aligned for insertion into wallboard 120. The alignment of sections 705 and 720 is rigid for insertion. Insertion is accomplished by force from a driving device such as a hammer, handle of a screwdriver, or manual pressure from a thumb applied to the rear or proximal face of head portion 715. Note locking tooth 139 is included in this figure. Tooth 139 is included when pins 140 of the types shown in FIGS. 1D and 1E are to be used. It is not required when pin 140 includes only bump 746 (FIG. 7E), or when the pin shafts are threaded (FIGS. 1D-A through 1D-E, and 1E-B), as described below in connection with FIGS. 7E and 7F.

Figure 7D:
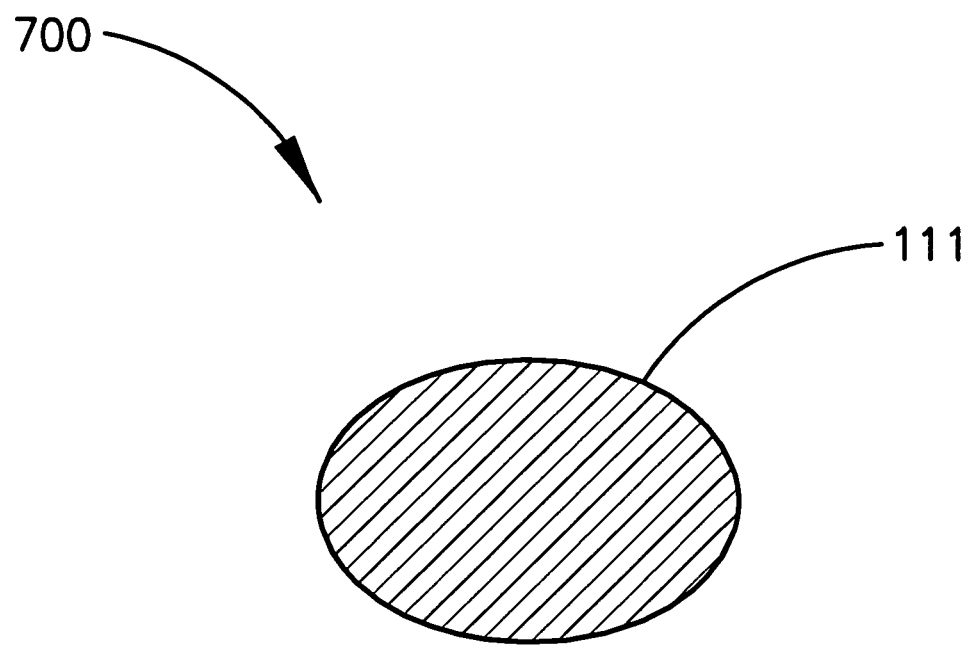
Figure 7E:
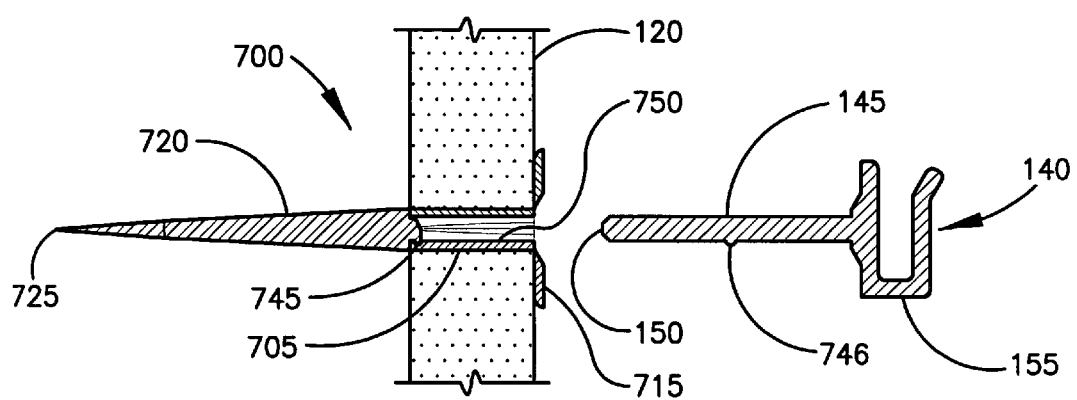

FIG. 7C show various cross-sectional shapes that may be used for wall-anchor section 705. FIG. 7C-A shows a dilatable bore 750 comprising a round or elliptical-shaped center portion 755 with a radial elliptical extension 760. Alignment fins 710 are also shown. The shape and elasticity of bore 750 permits fastener 700 to receive pin shafts with a wide variety of sizes and cross-sectional shapes, as shown in FIGS. 1D and 1E. FIG. 7C-B shows an H-shaped bore. FIG. 7C-C shows an elliptical bore. FIGS. 7C-D and 7C-E show other bores combining elliptical and parallelogram shapes.

FIG. 7D shows the elliptical cross-section 111 of section 720 of fastener 700.

FIG. 7E shows fastener 700 embedded in wallboard 120, prior to insertion of pin 140. Pin 140 comprises a rear hook 155, a shaft 145 with a tip 150, and a bump 746. Any of the pin designs shown in FIGS. 1D and 1E or variations on these designs can be used, including those with ratchets and threads.

Figure 7F:
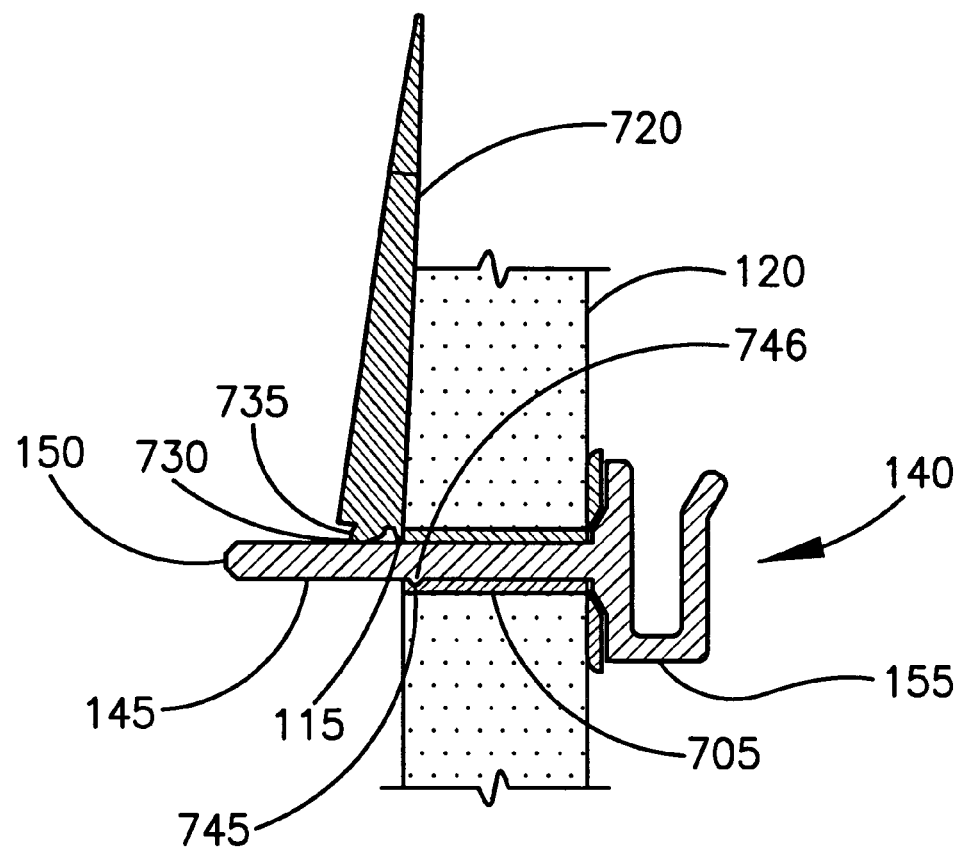

FIG. 7F shows fastener 700 fully inserted in wallboard 120 and ready for use. Shaft 145 of pin 140 has forced section 720 to rotate about hinge 115. Shaft 145 is firmly wedged against projection 735, forcing section 720 against the inside surface of wallboard 120. Bump 746 on shaft 145 of pin 140 is firmly lodged in notch 745.

Instead of providing bump 746 to engage notch 745, any of pins 140 (FIGS. 1D and 1E) can be inserted and will engage locking tooth 139 (FIG. 7B) if it is present.

Note in this instance, section 720 is oriented above section 705. When a load hangs on hook 155 of pin 140, a moment of torque exists which urges section 705 to rotate within wallboard 120. This torque is balanced in part by wallboard 120 at section 705, and partly by section 720 resting against the inner surface of wallboard 120. The distribution of forces in this orientation results in a restoring torque with an arm the length of section 705, which gives added strength to fastener 700.

FIG. 7G shows an optional metal tip 725' affixed to tip 725 of pivotable section 720. Tip 725' may be used when wallboard 120 is made of materials have properties which differ from those of standard drywall, e.g. are harder, softer, more pliable, etc, and a hard tip is desired or required.

Various tip shapes are possible. Instead of the nail-shaped tip 725' with a simple point, tips 725 (FIG. 7A) and 725' can assume a spoon chisel shape, as shown in FIG. 7H-A, a double nail head with a curved chisel, FIG. 7H-B, a pointed chisel, FIG. 7H-C, a simple chisel, FIG. 7H-D, or a spear chisel, as shown in FIG. 7H-E, etc.

Figure 7I:
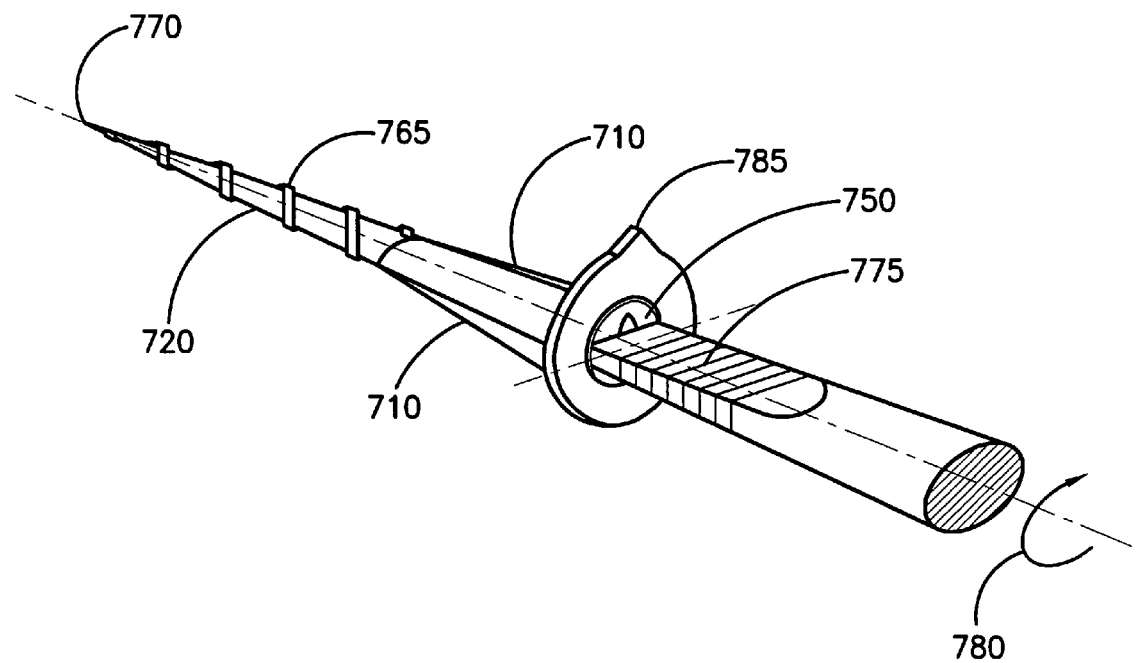

FIG. 7I shows a variation on the above design. External threads 765 are formed on section 720, and a drill tip 770 is optionally added to form a drill-and-thread combination. To install, fastener 700 is first placed in the initial configuration with sections 705 and 720 coaxially aligned. Tip 770 is placed against the wall (not shown) where anchor 700 is to be installed. A screwdriver tip 775 is inserted into bore 750 and turned (either manually or with a power tool) as indicated by arrow 780. Tip 775 is shown as a flat blade, however any shape that engages bore 750 will do. When wall anchor section 705 reaches the surface of wallboard 120 (not shown in this figure), screwdriver tip 775 is removed and fastener 700 is forced into the wall by the user's thumb or a hammer. A pointer 785 is used to orient fastener 700 prior to its finally being forced into the wall. When pointer 785 is facing upward, pivotable section 720 will pivot upward, as shown in FIG. 7F, when pin 140 is installed. As before, fins 710 prevent rotation of fastener 700 when it is fully inserted into wallboard 120.

CONCLUSION, RAMIFICATIONS, AND SCOPE

From the above, the reader will see that the present fastening system provides novel methods and apparatus for anchoring articles firmly to walls and ceilings. The fasteners do not require a pre-made hole since the body of the fastener can be inserted into the wall using a hammer or the like. In the case of a previously existing hole, the fastener can be manually inserted with force from by a user's thumb. Then the user inserts the activating pin. The pin activates the fastener, binding it securely to the wall, and also provides a hanger for mounting cabinetry, mirrors, pictures, and the like. The pin can be inserted by simple manual effort, either by pressing with the user's thumb, or by screwing it in manually with the user's fingers or a screwdriver or wrench.

The present fastener works with a range of wall thicknesses. When the wall is thinner than the length of the wall-anchor section, the fastener's pivotal portion rotates around its living hinge, strap, flap, lanyard, or other type of connector, meeting the inner surface of the wall. When the wall is thicker than the length of the wall-anchor section, the fastener's pivotal portion rotates less than 90 degrees and wedges against the inner surface of the wall.

The fastener's elliptical cross-section advantageously combines the strength of the volume of material in the fastener and reduces the pressure applied to the wall material. The elliptical cross-section, in combination with fins in the wall-anchor portion, further acts to prevent blow-out of wall material caused by rotation of the fastener.

Abutting and rigidly securing the front and rear sections of the fastener during hammering prevents wobbling and crumpling as the fastener is hammered into a wall. In the embodiments of FIGS. 4A through 6B, a plurality of arms are initially in contact with no gaps. The tips on these arms remain pressed together as the fastener is driven through the drywall, again preventing wobbling and crumpling.

A variety of pin designs are possible. A single fastener body accommodates many different pin types which are inserted into a dilatable bore that combines variations of circular, rectangular, and elliptical shapes.

While the above description contains many specificities, these should not be considered limiting but merely exemplary. Many variations and ramifications are possible.

For example instead of a tapered elliptical cross-section, a tapered rectangular, star-shaped, or other cross-section could be used. Instead of an attachment point such as a hook, a pin can comprise an extension of a cord which, in turn, can be tied around a load. The edge on the pivoting section is also known as a cam follower, finger, knob, protrusion, lobe, and the like.

While the present system employs elements which are well known to those skilled in the art of ground anchor design, it combines these elements in a novel way which produces a new result not heretofore discovered. Accordingly the scope of this invention should be determined, not by the embodiments illustrated, but by the appended claims and their legal equivalents.

The invention claimed is:

1. A wall anchor, comprising:
an elongated member comprising a distal pivotable section and a proximal wall anchor section, an outer perimeter of said distal pivotable section being aligned substantially symmetrically and coaxially along a short axis and along a long axis with an outer perimeter of said proximal wall anchor section in an initial configuration, said proximal wall anchor section having an outer cross-section with the short axis and the long axis, a bore therethrough, and a mating surface facing said distal pivotable section in said initial configuration,
said distal pivotable and proximal wall anchor sections being pivotably joined so that said distal pivotable section can pivot with respect to said proximal wall anchor section,
said distal pivotable section having a sharp forward end, said sharp forward end and said bore being collinear with one another,
said distal pivotable section having a cam follower portion with a cammable or cam follower surface opposite said forward end and facing said proximal wall anchor section, said cammable surface positioned so that when said elongated member is in said initial configuration and an elongated activating member is inserted through said bore of said proximal wall anchor section, said activating member will contact said cammable surface and force said distal pivotable section to pivot away from said proximal wall anchor section to an expanded or anchoring configuration,
said distal pivotable section having a mating surface facing and contiguous to said mating surface of said proximal wall anchor section when said elongated member is in said initial configuration so that when said wall anchor is driven into a wall, said distal pivotable and proximal wall anchor sections will retain said initial configuration and will not pivot apart or separate until activated to said expanded or anchoring configuration.

2. The wall anchor of claim 1 wherein the cross-sections of said distal pivotable and proximal wall anchor sections have an oval shape.

3. The wall anchor of claim 1 wherein said distal pivotable section and said proximal wall anchor section are pivotably joined by hinge means selected from the group consisting of hinges, lanyards, straps, and flaps.

4. The wall anchor of claim 3 wherein said hinge means is outside of said mating surfaces of said distal pivotable and proximal wall anchor sections.

5. The wall anchor of claim 1 wherein the cross-section of said bore is selected from the group consisting of elliptical, rectangular, square, and combinations of round, elliptical, and parallelogram.

6. The wall anchor of claim 1 wherein said anchor is made of a material selected from the group consisting of plastics, metals, and hardwoods.

7. The wall anchor of claim 1 wherein said sharp forward end of said distal pivotable section is metal.

8. The wall anchor of claim 1 wherein said wall anchor has an axis in said initial configuration and said pointed forward end of said distal pivotable section lies on said axis.

9. The wall anchor of claim 1 wherein said distal section further includes external threads.

10. The wall anchor of claim 1 wherein the shape of said sharp forward end is selected from the group consisting of points, spoon chisels, double nails with curved chisels, pointed chisels, chisels, spear chisels, and drills and threads.

11. The wall anchor of claim 1, further including said activating member, said activating member being a pin.

12. The wall anchor of claim 11 wherein said shaft of said pin further includes at least one shape selected from the group consisting of threads, notches and bumps.

13. The wall anchor of claim 11 wherein said pin further terminates in a head selected from the group consisting of screw heads, bolt heads, flat heads and hooks.

14. The wall anchor of claim 1 wherein said bore further includes at least one shape selected from the group consisting of threads, locking teeth, and notches.

15. The wall anchor of claim 14 wherein said bore further includes threads having a predetermined characteristic, and said activating member includes complementary threads, whereby when said threads of said bore and said threads of said activating member are engagingly turned, said wall anchor will be activated.

16. The wall anchor of claim 1, further including said activating member, said activating member comprising a pin with a shaft and ratchet teeth, said proximal section further including a locking tooth, wherein when said shaft is inserted into said proximal section, at least one of said ratchet teeth engages said locking tooth, thereby securing said activating member in said proximal section.

17. The wall anchor of claim 1, further including said activating member, said activating member comprising a pin with a shaft and threads, the diameter of said bore of said proximal section being smaller than the outer diameter of said threads, so that when said shaft is turned, said threads cut into said bore of said proximal section, thereby securing said activating member in said proximal section.

18. The wall anchor of claim 1, further including said activating member, said activating member comprising a pin with a shaft and a bump, said proximal section further including a notch, so that when said shaft is inserted into said proximal section, said bump engages said notch, thereby securing said activating member in said proximal section.

19. The wall anchor of claim 1 wherein said wall anchor has an axis in said initial configuration and said mating surfaces of said distal pivotable and proximal wall anchor sections are generally perpendicular to said axis.

20. The wall anchor of claim 1 wherein said mating surfaces of said distal pivotable and proximal wall anchor sections have an annular or endless band shape and surround said cam follower portion in said initial configuration.

21. The wall anchor of claim 1 wherein said wall anchor has an axis in said initial configuration and said mating surfaces of said distal pivotable and proximal wall anchor sections are generally perpendicular to said axis, and have an annular or endless band shape and surround said cam follower portion in said initial configuration.

22. The wall anchor of claim 1 wherein said distal section has a smooth, non-finned outer surface.

23. The wall anchor of claim 1 wherein said distal pivotable and proximal wall anchor sections contain a mating notch and projection so that when said sections are axially aligned, said notch and projection will mate and hold said sections in rigid axial alignment.

24. A method for anchoring an object to a wall, comprising:
providing a wall anchor having contiguous distal pivotable and proximal wall anchor sections, wherein an outer perimeter of said distal pivotable section is aligned along two axes in an initial substantially symmetric and coaxial configuration with an outer perimeter of said proximal wall anchor section, said distal pivotable section having a sharp end and being pivotably joined to said proximal wall anchor section at the other end, said proximal wall anchor section having a rear end and an outer cross-section with a short axis and a long axis and a bore therethrough, said sharp end and said bore being collinear with one another,
providing pivot means for causing said distal pivotable section to pivot in response to force from an elongated activating member inserted into and through said proximal wall anchor section in said initial configuration,
selecting a location on a wall that has a hollow volume therebehind,
passing said tip and said anchor through said wall at said location until said rear end is in contact with said wall with said anchor in said initial configuration,
providing the elongated activating member,
inserting said elongated activating member into said bore to contact said pivot means and force said distal pivotable section to pivot,
whereby said elongated activating member will force said distal pivotable section to pivot away from said proximal wall anchor section to an expanded or anchoring configuration.

25. The method of claim 24 wherein said elongated activating member is a pin.

26. The method of claim 24 wherein said anchor is driven through said wall to create a hole in said wall.

27. The method of claim 24 wherein said anchor is inserted into a previously-provided hole in said wall.

28. The method of claim 24 wherein said rear end further includes a pointer, said pointer indicating the direction of rotation of said distal section when said activating member forces said distal section to pivot away from said proximal section.

29. The method of claim 24 wherein said activating member comprises a pin with a shaft and ratchet teeth, said proximal section further including a locking tooth, such that when said shaft is inserted into said proximal section, at least one of said ratchet teeth engages said locking tooth, thereby securing said activating member in said proximal section.

30. The method of claim 24 wherein said activating member comprises a pin with a shaft and threads, the diameter of said bore of said proximal section being a smaller than the outer diameter of said threads, so that when said shaft is turned, said threads cut into said bore of said proximal section, thereby securing said activating member in said proximal section.

31. The method of claim 24 wherein said activating member comprises a pin with a shaft and a bump, said proximal section further including a notch, so that when said shaft is inserted into said proximal section, said bump engages said notch, thereby securing said activating member in said proximal section.

32. The method of claim 24, further providing threads having predetermined characteristics in said bore, and providing complementary threads on said activating member, so that when said threads of said bore and said threads of said activating member are engagingly turned, said wall anchor is activated.

33. A hollow wall anchor, comprising:
a distal pivotable section and a proximal wall anchor section hingedly attached to said distal pivotable section so that an outer perimeter of said distal pivotable section is aligned substantially symmetrically and coaxially along at least two common axes with an outer perimeter of said proximal wall anchor section in an initial configuration but so that said distal pivotable section can bend away from said common axis,
said distal pivotable section having a tip that lies on said axis in said initial configuration and pivot means for causing said distal pivotable section to bend away from said proximal wall anchor section in response to activation of said pivot means,
said proximal wall anchor section having an outer cross-section with a short axis and a long axis and a bore therethrough that is aligned with said pivot means in said initial configuration so that when an activating member is inserted through said bore it will contact and activate said activating member and cause said distal pivotable section to bend away from said proximal wall anchor section,
said distal pivotable section having a mating surface facing said proximal wall anchor section and said proximal wall anchor section having a mating surface facing said distal pivotable section, said mating surfaces being contiguous so that when said distal pivotable and proximal wall anchor sections are in said initial configuration and said wall anchor is driven into a wall, said distal pivotable and proximal wall anchor sections will retain said initial configuration and will not pivot apart or separate until said pivot means is activated, said distal pivotable section having a penetrating point collinear with said bore.

34. The wall anchor of claim 33 wherein said mating surfaces of said distal pivotable and proximal wall anchor sections have an annular or endless band shape and surround said pivot means in said initial configuration.

35. The wall anchor of claim 33 wherein said wall anchor has an axis in said initial configuration and said mating surfaces of said proximal wall anchor sections are generally perpendicular to said axis and have and annular or endless band shape and surround a cam follower portion in said initial configuration.

36. The wall anchor of claim 33 wherein said distal section has a smooth, non-finned outer surface.

37. The wall anchor of claim 33 wherein said distal and proximal wall anchor sections contain a mating notch and projection so that when said sections are axially aligned, said notch and projection will mate and hold sections in rigid axial alignment.

38. A wall anchor, comprising:
an elongated member comprising a distal pivotable section and a proximal wall anchor section, an outer perimeter of said distal pivotable section and an outer perimeter of said proximal wall anchor section being aligned substantially symmetrically and coaxially along at least two common axes in an initial configuration,
said proximal wall anchor section having an outer cross-section with a short axis and a long axis and a bore therethrough and having a mating surface facing said distal pivotable section in said initial configuration, said distal pivotable and proximal wall anchor sections being pivotably joined so that said distal pivotable section can pivot with respect to said proximal wall anchor section, said distal pivotable section having a sharp forward end, said sharp forward end and said bore being collinear with one another, said distal surface having a cam follower portion with a cammable or cam follower surface opposite said forward end and facing said proximal wall anchor section, said cammable surface positioned so that when said elongated member is in said initial configuration and an elongated activating member is inserted through said bore of said proximal wall anchor section, said activating member will contact said cammable surface and force distal pivotable section to pivot away from said proximal wall anchor section to an expanded or anchoring configuration, said bore of said proximal wall anchor section having a non-circular cross section so that said bore can be dilatable and can accept activating members having a variety of sizes.

39. The wall anchor of claim 38 wherein said bore of said proximal wall anchor section is elastic.

40. The wall anchor of claim 38 wherein said bore of said proximal wall anchor section has a cross sectional shape selected from the group consisting of elliptical, H-shaped, parallelepiped, and rectangular.

41. The wall anchor of claim 38 wherein said bore of said proximal wall anchor section has a locking tooth or ring and said distal pivotable section has a mating surface facing and contiguous said mating surface of said proximal wall anchor section when said elongated member is in said initial configuration so that when said wall anchor is driven into a wall, said distal and proximal wall anchor sections will retain said initial configuration and will not pivot apart or separate until activated to said expanded or anchoring configuration.

42. The wall anchor of claim 38 wherein said bore of said proximal section has a locking tooth or ring for engaging a pin which has threads or ratchet teeth when said pin is inserted into said bore.

43. A hollow wall anchor, comprising:

a distal pivotable section and a proximal wall anchor section hingedly attached to said distal pivotable section so that an outer perimeter of said distal pivotable and proximal wall anchor sections are aligned substantially symmetrically and coaxially along at least two common axes in an initial configuration but so that said distal pivotable section can bend away from said common axis, said distal pivotable section having a tip that lies on said common axes in said initial configuration and pivot means for causing said distal pivotable section to bend away from said proximal wall anchor section in response to activation of said pivot means, said proximal wall anchor section having an outer cross-section with a short axis and a long axis and having a bore therethrough that is aligned with said pivot means in said initial configuration so that when an activating member is inserted through said bore it will contact and activate said activating member and cause said distal pivotable section to bend away from said proximal wall anchor section, said bore being collinear with said tip, said distal pivotable section having a mating surface facing said proximal wall anchor section and said proximal wall anchor section having a mating surface facing said distal pivotable section, said bore of said proximal wall anchor section having a non-circular cross section so that said bore can be dilatable and can accept activating members having a variety of sizes.

44. The wall anchor of claim 43 wherein said bore of said proximal wall anchor section has a cross sectional shape selected from the group consisting of elliptical, H-shaped, parallelepiped, and rectangular.

45. The wall anchor of claim 43 wherein said distal pivotable section has a mating surface facing and contiguous said mating surface of said proximal wall anchor section when said elongated member is in said initial configuration so that when said wall anchor is driven into a wall, said distal pivotable and proximal wall anchor sections will retain said initial configuration and will no pivot apart or separate until activated to said expanded or anchoring configuration.

46. The wall anchor of claim 43 wherein said bore of said proximal section has a locking tooth or ring for engaging a pin which has threads or ratchet teeth when said pin is inserted into said bore.

47. The wall anchor of claim 43 wherein said bore of said proximal wall anchor section is elastic.

48. The wall anchor of claim 43 wherein said proximal wall anchor section has a flange at its proximal end and a pair of generally tapering fins extending from opposite sides of the outside of said proximal wall anchor section, respectively, to said flange, wherein said fins will decrease the elasticity of said bore.

49. A wall anchor, comprising:

an elongated member comprising a distal pivotable section and a proximal wall anchor section, an outer perimeter of said distal pivotable section and said proximal wall anchor sections being aligned substantially symmetrically and coaxially along at least two common axes in an initial configuration, said proximal wall anchor section having an outer cross-section with a short axis and a long axis and a bore therethrough and having a surface facing said distal pivotable section in said initial configuration, said distal pivotable and proximal wall anchor sections being pivotably joined so that said distal pivotable section can pivot with respect to said proximal wall anchor section, said distal pivotable section having a sharp forward end, said sharp forward end being collinear with said bore, said distal surface having a cam follower portion with a cammable or cam follower surface opposite said forward end facing said proximal wall anchor section, said cammable surface positioned so that when said elongated member is in said initial configuration and an elongated activating member is inserted through said bore of said proximal wall anchor section, said activating member will contact said cammable surface and force said distal pivotable section to pivot away from said proximal wall anchor section to an expanded or anchoring configuration, said proximal wall anchor section having flange at its proximal end and a pair of generally tapering fins extending from opposite sides of the outside of said proximal wall anchor section, respectively, to said flange.

50. The wall anchor of claim 49 wherein said bore of said proximal wall anchor section is elastic and wherein said distal pivotable section has a mating surface facing and contiguous said mating surface of said proximal wall anchor section when said elongate member is in said initial configuration so that when said wall anchor is driven into a wall, said distal pivotable and proximal wall anchor sections will retain said initial configuration and will not pivot apart or separate until activated to said expanded or anchoring configuration.

\* \* \* \* \*

UNITED STATES PATENT AND TRADEMARK OFFICE
CERTIFICATE OF CORRECTION

PATENT NO.         : 8,764,364 B2  
APPLICATION NO.    : 11/171088  
DATED              : July 1, 2014  
INVENTOR(S)        : Brian A. Brown et al.

Page 1 of 1

It is certified that error appears in the above-identified patent and that said Letters Patent is hereby corrected as shown below:

In the Specification

In Column 7, lines 7-12, "As stated, FIGS. 2A-2G show a cross-sectional views of fastener 100. Fastener 100 is supplied with rear fixed section 105 and front and pivotable section 110, as shown in FIG. 2A. If sections 105 and 110 have been bent out of axial alignment, i.e., they form an angle with respect to each other (not shown), the user should bend them so that their axes are aligned." to read as --FIGS. 2A-2G, 3A, and 3B show an additional, optional feature. Large female threads 200 in section 105 of fastener 100 can be added to accommodate large male threads 144 of pin 140L (FIG. 1E).--.

In Column 7, line 19, "FIGS." to read as --As stated, FIGS.--.

In Column 10, lines 29-30, "In This Embodiment (FIG. 6), Hinges Are Not Used. Instead, Two Pivoting Sections Are" to read as --In this embodiment (FIG. 6), hinges are not used. Instead, two pivoting sections are--.

In the Claims

In Column 15, line 55, Claim 30, "being a smaller" to read as --being smaller--.

Signed and Sealed this  
Twenty-fourth Day of February, 2015

Michelle K. Lee  
*Deputy Director of the United States Patent and Trademark Office*